United States Patent
Kanekal

Patent Number: 5,983,300
Date of Patent: Nov. 9, 1999

[54] DYNAMIC WINDOW MECHANISM FOR PREVENTING INVALID INFORMATION PROPAGATION FROM THE PCI BUS

[75] Inventor: Hemanth G. Kanekal, San Jose, Calif.

[73] Assignee: Cirrus Logic, Inc., Fremont, Calif.

[21] Appl. No.: 08/873,884

[22] Filed: May 12, 1997

[51] Int. Cl.$^6$ .................................................. G06F 13/14
[52] U.S. Cl. ..................... 710/110; 710/100; 710/107; 710/113; 710/129
[58] Field of Search .................... 395/280, 287, 395/290, 293, 309; 710/100, 107, 110, 113, 129

[56] References Cited

U.S. PATENT DOCUMENTS

| | | | |
|---|---|---|---|
| 5,581,713 | 12/1996 | Myers et al. ............................ | 395/299 |
| 5,649,175 | 7/1997 | Kanekal et al. ......................... | 395/551 |
| 5,802,324 | 9/1998 | Wunderlich et al. .................... | 395/281 |

*Primary Examiner*—Ayaz R. Sheikh
*Assistant Examiner*—Frantz Blanchard Jean
*Attorney, Agent, or Firm*—Frank D. Nguyen

[57] ABSTRACT

A method and apparatus to prevent invalid data from propagating into devices connected to a PCI tristate bus is provided. The method and apparatus utilize the PCI bus control signals to monitor the bus transaction's mode (e.g., as a bus target or as a bus master), type (e.g., read, write), and status (e.g., ongoing bus transaction). Using these information, control the opening and closing of a window gate hardware to allow valid data to propagate into a device connected to the PCI tristate bus and to prevent invalid data from propagating into the device.

35 Claims, 18 Drawing Sheets

DYNAMIC WINDOW MECHANISM FOR PREVENTING INVALID INFORMATION PROPAGATION FROM THE PCI BUS

FIELD OF THE INVENTION

The invention generally relates generally to network controllers in computer systems, and more particularly to a controller coupled to the Peripheral Component Interconnect (PCI) Local Bus.

BACKGROUND OF THE INVENTION

In the area of digital systems, the task of accommodating increasing bus traffic continues to pose a challenge. The primary bottle-neck in most bus transactions appears to be the system bus. The system bus is a bottle-neck primarily because many devices share the same bus and must contend for its resources.

The PCI bus is a high performance, 32-bit or 64-bit bus with multiplexed address and data lines which can accommodate multiple high performance peripherals. The PCI Bus supports burst modes in which a bus transaction may involve an address phase followed by one or more data phases in tandem with a command phase followed by one or more byte enable phases. As such, an external device may require the use of the bus for multiple clock cycles during a bus transaction which can exacerbate bottle-neck problems associated with a system bus. Reference is now made to FIG. 1 which illustrates an overview of a computer system that utilizes the PCI bus. In FIG. 1, computer system 100 comprises host CPU 101, host memory 102, peripheral hardware controller 103, and bridge device 105. Peripheral hardware controller 103 is coupled to host CPU 101 and host memory 102 through PCI bus 104. More particularly, peripheral hardware controller 103 provides an interface between PCI bus 104 and external devices such as disk drivers, display monitors, parallel data port, local area network, wide area network, or the like.

In general, host CPU 101 and external devices may take turns controlling PCI bus 104 in carrying out transactions such as read and write transactions. While a device which takes control of PCI bus 104 to initiate the transaction is known as a "bus master" device, a device at the other end of the transaction is known as a "bus target" (or "slave") device. Information that are involved in bus transactions between devices include data, address, commands, byte enables, and identification of bus master and bus target device.

While a bus may be synchronous or asynchronous, PCI bus is a synchronous bus. In other words, information flowing from the bus master device to the target device and vice versa are synchronized to a system clock such that a bus transaction must take place in an integral number of synchronized clock cycles. In carrying out bus transactions, bus protocols must be followed. These protocols consists mainly of bus mastership, requests for read or write transactions, and acknowledgment of such requests. PCI bus protocols can be found in "The PCI Local Bus Specification Rev 2.1", published by the PCI Special Interest Group, P.O. Box 14070, Portland, Ore. 97214 and incorporated herein by reference.

The PCI bus can be tristated which means that the bus is floated to indicate that it is available for use. When a bus is floated, it generally indicates to devices connected to it that it is available for usage. However, depending on the threshold voltage of a device connected to the bus, the logic value associated with a tristated PCI bus may inadvertently trigger an undesired state in the device connected to the bus. In the Prior Art, to prevent the propagation of invalid data values into a device, flip-flops or latches are implemented inside the device to hold known and unknown data propagated from the bus until it can be determined whether the data is valid or not. Having additional flip-flops or latches for this purpose is not cost efficient.

Hence, there is a need for an apparatus, system, and method to prevent invalid data from propagating into a device connected to the bus without incurring unnecessary added costs.

SUMMARY OF THE INVENTION

Accordingly, the present invention provides an apparatus, system, and method to prevent invalid data from propagating into a device connected to the bus without incurring unnecessary added costs.

The present invention meets the above need with an apparatus to control information transfer in and out of a device connected to a computer bus. In general, the apparatus utilizes the PCI bus control signals to monitor the bus transaction's mode (e.g., as a bus target or as a bus master), type (e.g., read, write), and status (e.g., ongoing bus transaction). Using these information, control the opening and closing of a window gate hardware to allow valid data to propagate into a device connected to the PCI tristate bus and to prevent invalid data from propagating into the device.

The apparatus comprises a window hardware circuit, an address decoder, a target mode window closer, a master mode window closer, a target window controller, a fast opener circuit, and a master window controller.

The window hardware circuit is coupled to the computer bus. The window hardware circuit allowing address, data, command, byte enable, and device identification information to pass through as outputs to the device in response to a first and a second control signal. The address decoder is coupled to the window hardware circuit and the computer bus. The address decoder generates a signal indicating whether an address output from the window hardware circuit is valid. The target mode window closer is coupled to the computer bus. The target mode window closer also receives a signal indicating whether a transaction is a write or read transaction. In response to these inputs, the target mode window closer generates a first internal stop signal when the transaction is complete and when the transaction is a read transaction.

The master mode window closer is coupled to the computer bus. The master mode window closer also receives a signal indicating whether there is an active bus master and a signal indicating whether there is another device requesting control of the bus. The master mode window closer generates a second internal stop signal when there is an active bus master and when there is another device requesting control of the bus.

The target window controller is coupled to the computer bus, the address decoder, the target mode window closer, and the master mode window closer. The target window controller generates a third internal stop signal. The fast opener circuit is coupled to the computer bus, the target window controller, and the window hardware. The fast opener circuit generates the first control signal. The master window controller is coupled to the computer bus and the window hardware. The master window controller also receives the signal indicating whether there is an active bus master. In response to the inputs, the master window controller generates the second control signal.

All the features and advantages of the present invention will become apparent from the following detailed description of its preferred embodiment whose description should be taken in conjunction with the accompanying drawings.

BRIEF DESCRIPTION OF THE DRAWINGS

Prior Art

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
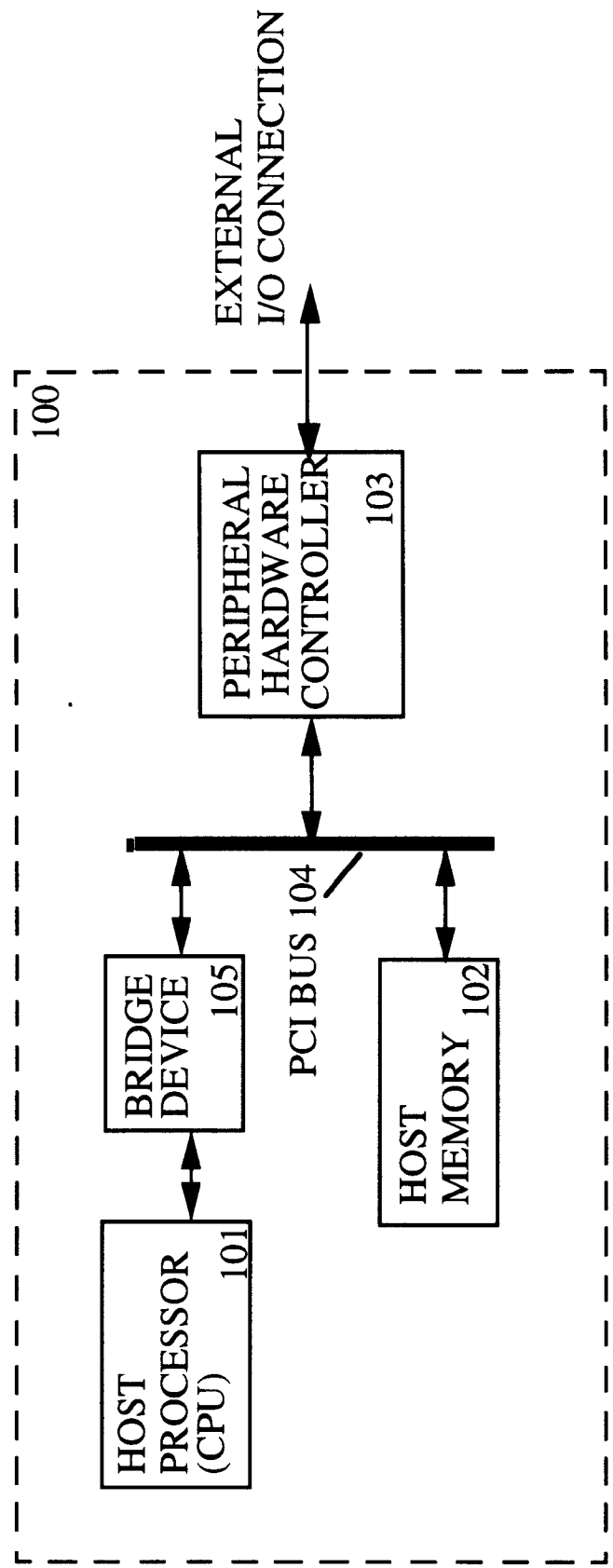
FIG. 1 is a block diagram illustrating a typical computer system that uses PCI bus in the computer system.
Figure 2:
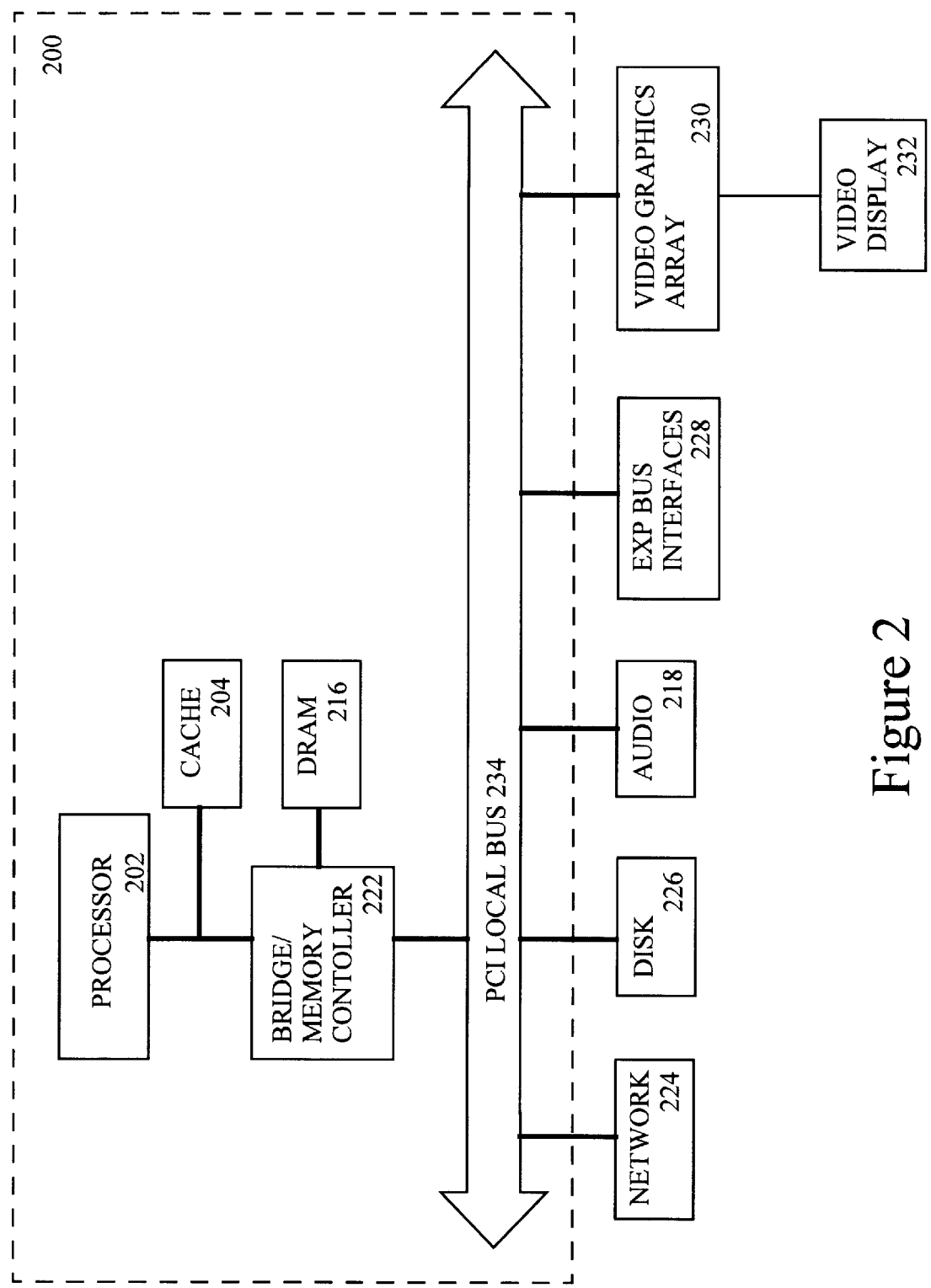
FIG. 2 is a block diagram illustrating a computer system implementing the present invention.

Reference is now made to FIG. 2 illustrating a block diagram of computer system 200 utilizing aspects of the present invention. Computer system 200 comprises a host processor system chip set which includes host processor 202, cache memory 204, bridge/memory controller 222, and dynamic random access memory 216. Host processor 202 may be any one of a number of commercially available microprocessors such as those marketed by Intel® (Santa Clara, Calif. and Motorola® (Schaumburg, Ill. PCI bus 234 couples bridge-memory controller 222 to a number of external devices such as local area network controller 224, hard disk controller 226, audio controller 218, video graphics array 230, and other expansion bus interfaces 228. Video graphics array 230 may drive display device 232 such as a monitor or a liquid crystal display device.

Bridge/memory controller 222 is used to directly access any external device coupled to PCI bus 234. Generally, such external devices are mapped in memory or I/O address spaces. Bridge/memory controller 222 also performs data buffering/posting and PCI bus central functions (e.g., arbitration). While bridge/memory controller 222 may be considered as a PCI bus master, any of the external devices coupled to PCI bus 234 may also act as a bus master.

Although the present invention is practiced in a PCI bus environment, it is to be understood that the invention is applicable to any type of synchronous system bus with appropriate protocols. Furthermore, while the present invention has applicability in network controllers such as LAN controllers and the like, the best mode, it is to be understood that the invention is applicable to any peripheral controllers such as disk controllers, audio controllers, graphics controllers etc.

Figure 3:
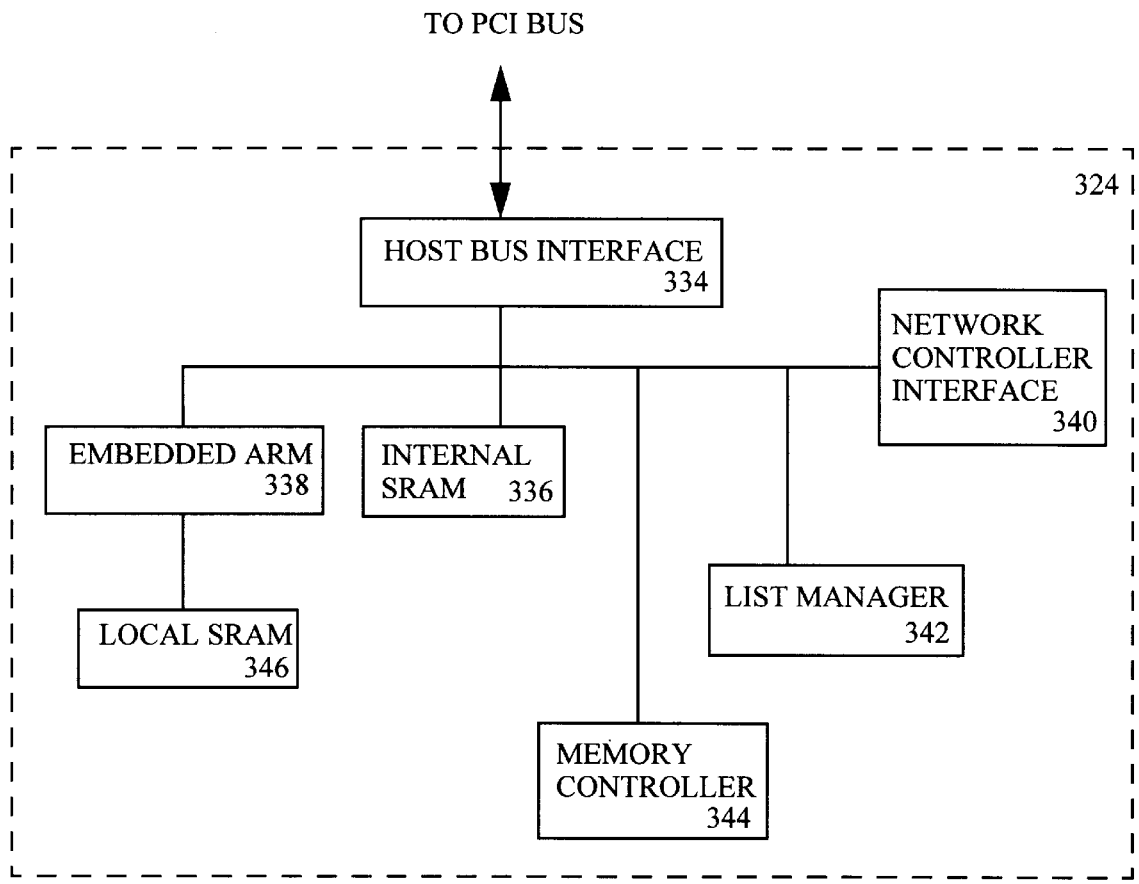
FIG. 3 is a block diagram of the network controller in the computer system of FIG. 2.

FIG. 3 is an overall block diagram of network controller 324. Host bus interface 334 connects network controller 324 to PCI bus 234. In addition to performing address decoding to access I/O devices and memory locations, host bus interface responds to applicable CPU commands and controls. The present invention resides inside host bus interface 334. Embedded ARM processor 338 is a local processor which helps to offload central processor 202 in terms of processing. ARM processor 338 helps to direct data traffic inside network controller 324. ARM processor 338 is also used to assemble data that comes through into the desired format. In asynchronous modes, such function is called segmentation and reassembly.

Network controller interface 340 provides the interface to communications networks to which network controller 324 is connected. List manager 342 controls the transfer of data to and from internal static random access memory (SRAM) 336. When network data signals come in from communications networks, list manager 342 formats and stores the data into internal SRAM 336. List manager 342 also communicates with ARM processor 338 about the occurrence of certain activities. In response, ARM processor 338 executes instruction codes stored in local SRAM 346 to perform predetermined tasks. Memory controller 344 is connected to an external dynamic random access memory (DRAM) (not shown). Memory controller 344 retrieves from the external DRAM additional instruction codes, which when executed by ARM processor 338 carry out additional tasks.

Figure 4:
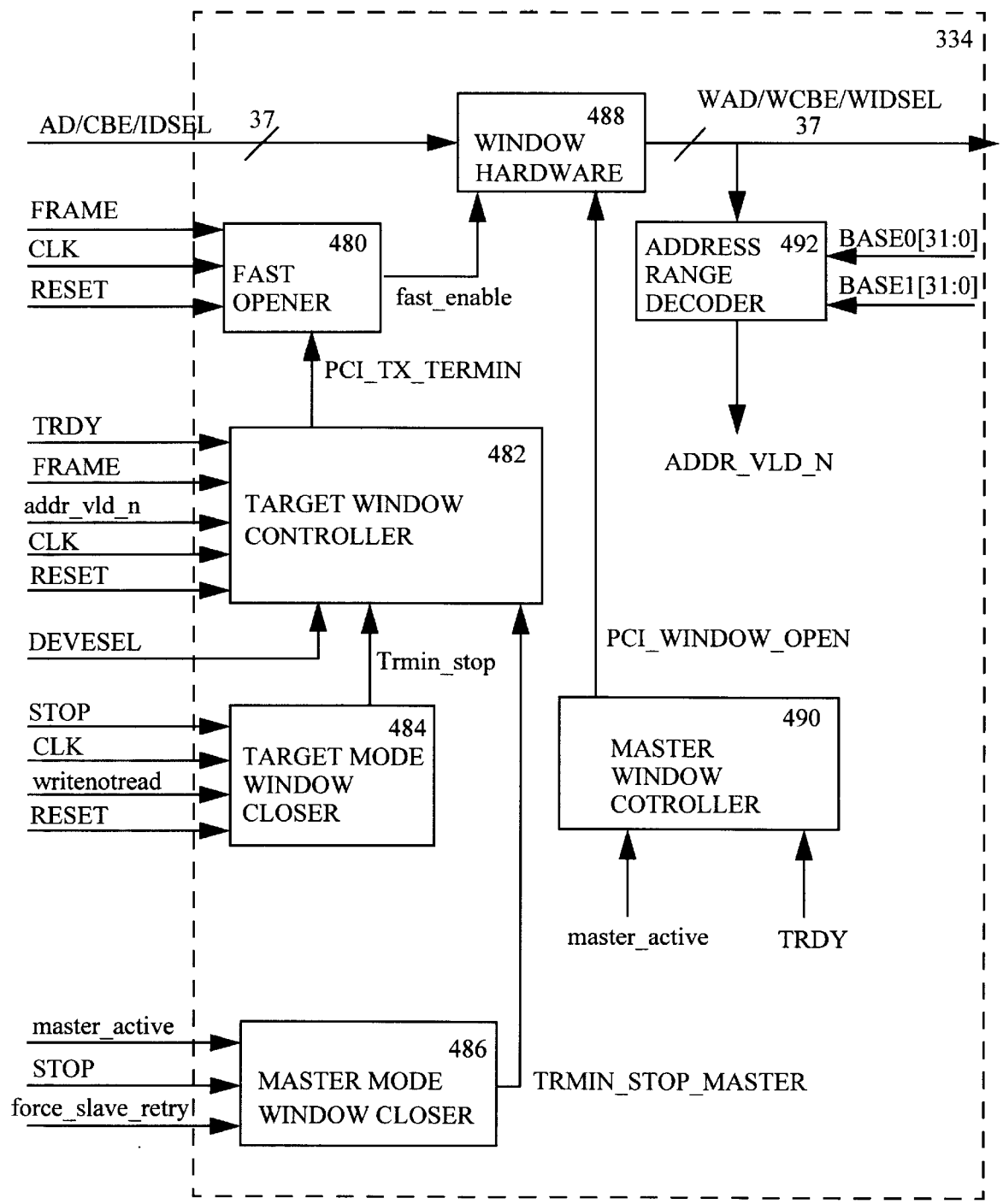
FIG. 4 is a block diagram illustrating a portion of the host bus interface in the network controller of FIG. 3 in accordance to the present invention.

In accordance with the present invention, various PCI bus control signals and other internal signals are monitored to determine whether information should be allowed to propagate through to network controller 324. Referring now to FIG. 4 which is a block diagram of host bus interface 334 comprising window hardware 488, fast opener 480, target window controller 482, target mode window closer 484, master mode window closer 486, master window controller 490, and address range decoder 492. Host bus interface 334 also has a target state machine (not shown) and a master state machine (not shown) which generates some internal signals. As shown in FIG. 4, while all the upper-case signals are coming of the PCI bus, all the lower-case signals are internal signals.

Window hardware 488 receives as inputs address & data signals AD (32 bits), bus command & byte enables signal C/BE (4 bits), and identification select signal IDSEL (1 bit). Window hardware 488 also receives as inputs control signals fast_enable and pci_window_open. Based on the state of control signals fast_enable and pci_window open, window hardware 488 determines whether or not to allow signals AD, C/BE, and IDSEL to pass through as signals wad (windowed address & data), wcbe (windowed command & byte enable), and widsel (windowed identification select) respectively. Hence, window hardware 488 acts as a gate to allow valid data through and prevent invalid data from propagating into network controller 324. Signals fast_enable and pci_window_open are provided by fast opener circuit 480 and master window controller 490 respectively.

Fast opener circuit 480 receives as inputs bus signals FRAME, CLK, RESET, as well as control signal pci_tx_termin from target window controller 482. In general, signal FRAME indicates to fast opener circuit 480 the occurrence of a bus transaction on the PCI bus which prompts fast opener to generate signal fast_enable to window hardware 488 to open its window to allow the input data to pass through as output. On the other hand, when signal pci_tx_termin is de-asserted, it triggers fast opener circuit 480 which in turn signals window hardware 488 to close its window and not let its inputs pass through as output.

Target window controller 482 receives as inputs target ready signal TRDY, bus transaction signal FRAME, address-not-valid signal addr_vld_n, clock signal CLK, signal RESET, and device select signal DEVSEL. Address-not-valid signal addr_vld_n, which is generated by address range decoder 492, indicates whether the address received is valid. Device select signal DEVSEL indicates that a device connected to the bus has been selected and as such, it can be used to indicate whether the transaction is valid. Target window controller 482 also receives as inputs control signal Trmin_stop from target mode window closer 484 and control signal Trmin_stop_master from master mode window closer 486. Target window controller 482 examines the aforementioned input signals to determine when to de-assert signal pci_tx_termin to close the gate. Target window controller 482 de-asserts signal pic_tx_termin in a few scenarios such as when the transaction is complete, when the data received is determined to be invalid, when there is a read transaction and protocols require that the bus be floated in the middle of the transaction to allow data to be sent over the bus, etc.

Target mode window closer 484 receives as inputs stop signal STOP, clock signal CLK, reset signal RESET, and indicator signal writenotread. Signal writenotread indicates whether the transaction is a target write or target read. Stop signal STOP indicates that the end of the current data cycle and the start of a different transaction at the next clock cycle. Based on these input signals, target mode window closer 484 determines, for example, whether the transaction is complete or whether the transaction is a read to determine whether to assert signal Trmin_stop. In general, signal Trmin_stop is asserted when the device (e.g., network controller 224) is a target, and the transaction is terminated by the assertion of STOP signal.

Master mode window closer 486 receives as inputs master_active signal, stop signal STOP, and signal force_slave_retry. When asserted, master_active signal indicates that a selected device (e.g., network controller 224) intends to be a master of the bus and it is ready to initiate a transaction. However, master_active signal does not indicate whether the selected device has successfully gained control of the bus. Signal force_slave_retry indicates that there is now a bus master and all other devices have to retry their transactions later. Based on these input signals, master mode window closer 486 determines if there is an active bus master and if there is any other device contending for control of the bus. If network controller 224 is not active and there is a device wanting control of the bus, master mode window closer 486 asserts signal Trmin_stop_master. In general, signal Trmin_stop_master is asserted when the device is a master.

Master window controller 490 receives as inputs master_active signal, target ready signal TRDY, clock signal CLK, and reset signal RESET. Based on these input signals, master window controller 490 determines whether network controller 224 is a master of the bus. If it is determined that network controller 224 is a master of the bus, master window controller 490 asserts signal pci_window_open to window hardware 488 to open the window.

Address range decoder 492 receives window address & data signal wad, window command & byte enable signal wcbe, and window identification select signal widsel. Address range decoder 492 also receives signals base0[31:m] and base1[31:n] which indicate the address range of the memory address space and the I/O address space. These signals base0[31:m] and signals base1[31:n] where $0 \leq m \leq 31$ and $0 \leq n \leq 31$ are bits in a configuration register. More particularly, m and n are bit values of the upper most significant bit within the 32 bits of address space. The implementor of the device determines what these values should be. For example, for an address range of 32 words, the lower five bits are excluded from the address comparator. In other words, only bits [31:6] of the incoming address is compared against base0[31:6] and base1[31:6] which is part of the configuration register. Address range decoder 492 decodes window address & data signal wad, window command & byte enable signal wcbe, and window identification select signal widsel and check them against the address ranges of the memory and I/O space. If the address is from either the memory space or the I/O space, address range decoder 492 asserts signal addr_vld_n LOW. Address range decoder 492 also asserts sign addr_vld_n LOW if a valid configuration register is selected.

Figure 5:
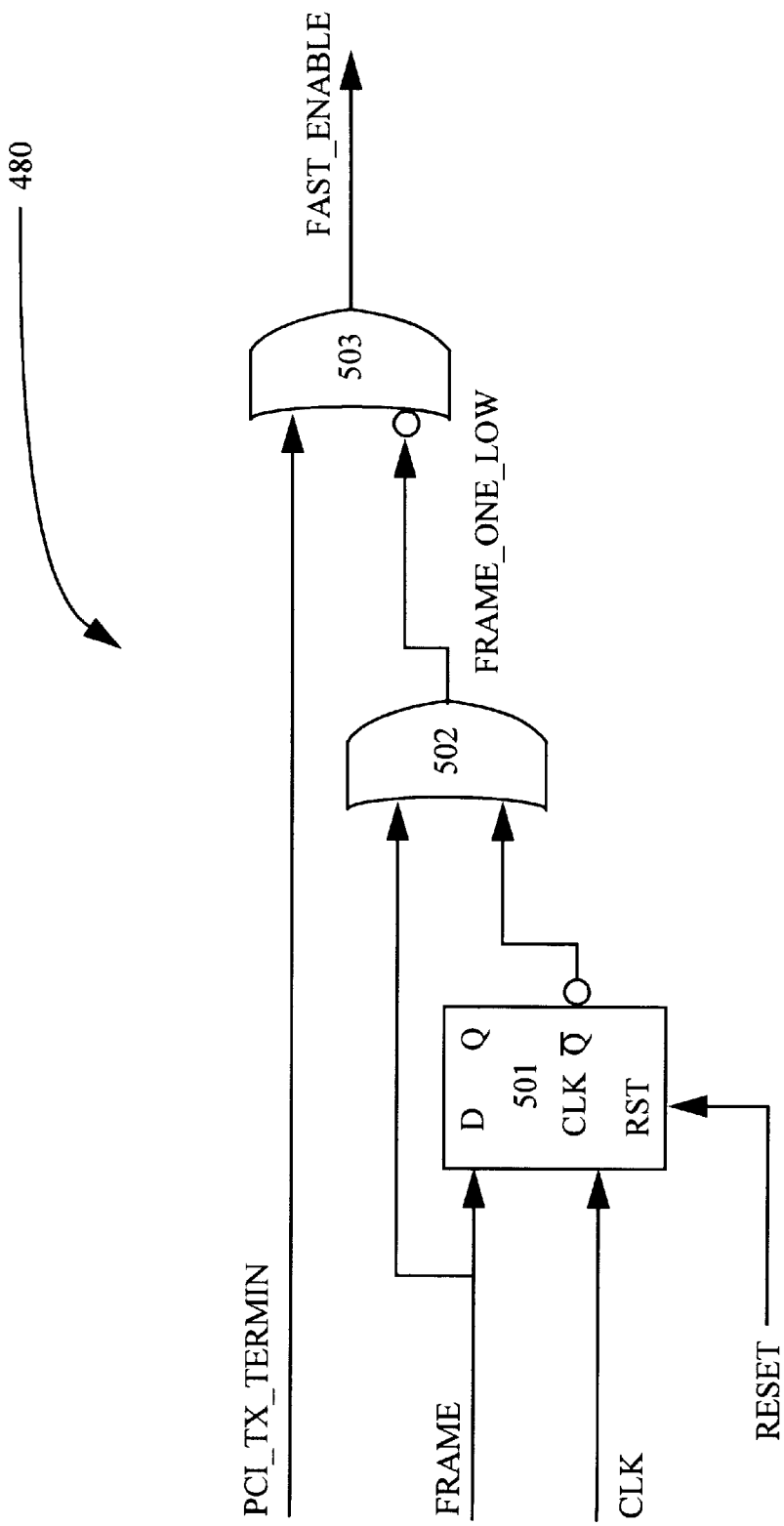
FIG. 5 is a gate-level schematic of the fast opener circuit in FIG. 4.

Referring now to FIG. 5 illustrating a gate-level diagram of fast opener circuit 480. As shown in FIG. 5, fast opener circuit 480 includes flip-flop 501, OR-gate 502, and OR-gate 503. Flip-flop 501 receives bus transaction indicator signal FRAME as input. Flip-flop 501 is clocked by system clock signal CLK. Flip-flop 501 can be reset by RESET signal. OR-gate 502 receives as one input the Q-bar output of flip-flop 501 and as a second input bus transaction indicator signal FRAME. Since signal FRAME is asserted LOW when there is a bus transaction and is HIGH when there is not, OR-gate 502 outputs a HIGH signal when there is a transition from LOW-to-HIGH, when there is a transition from HIGH-to-LOW, and when signal FRAME stays HIGH. As such, by inverting the output of OR-gate 502, the output of OR-gate 502 is always HIGH when there is a transaction on PCI bus 234 between two consecutive clock cycles. The output of OR-gate 502 together with signal pci_tx_termin are provided as input to OR-gate 503. Accordingly, OR-gate 503 outputs a HIGH fast_enable signal when there is a transaction on PCI bus 234 between two consecutive clock cycles unless signal pci_tx_termin is asserted LOW to indicate that the transaction is terminated.

Figure 6:
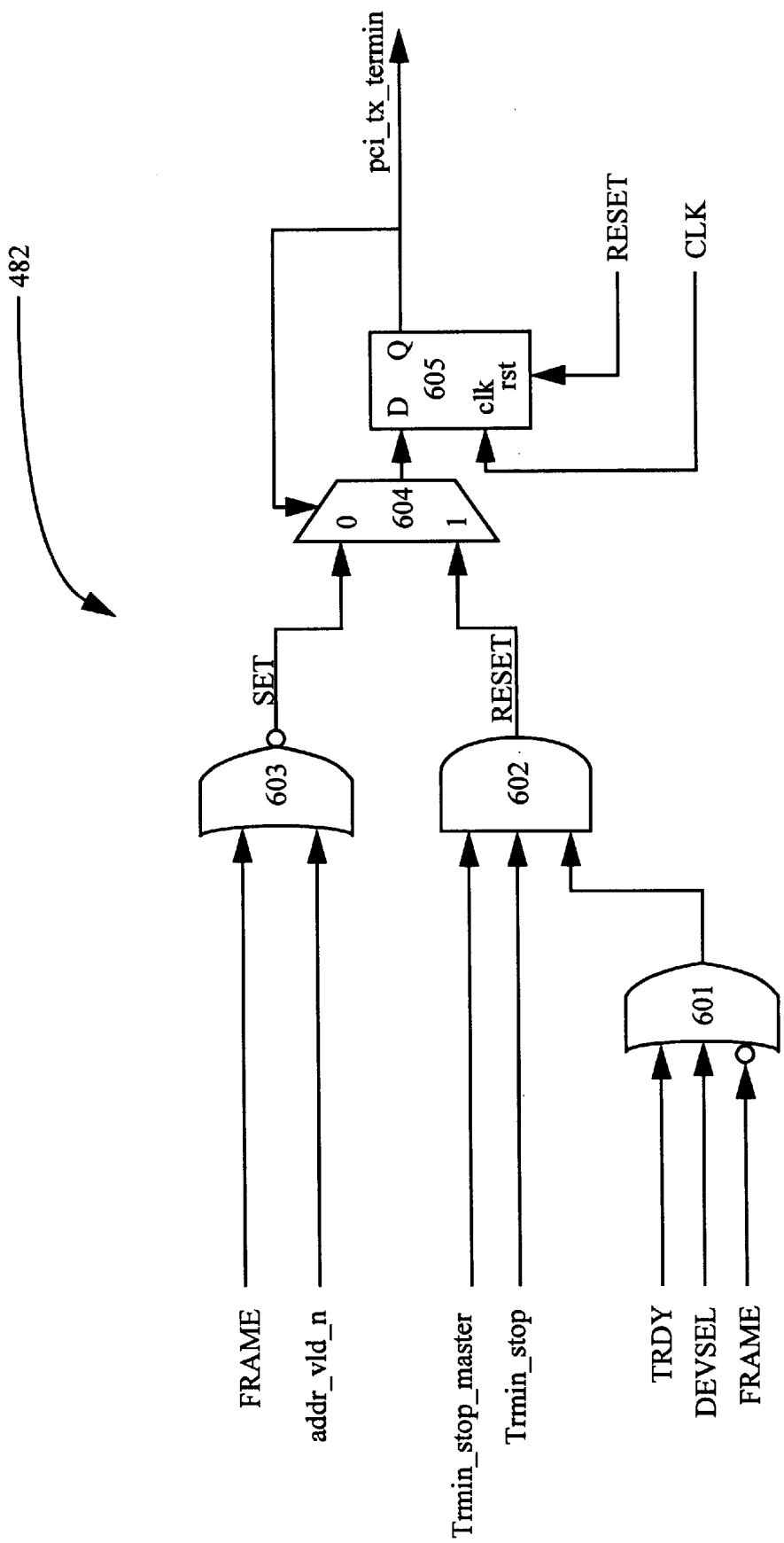
FIG. 6 is a gate-level schematic of the target window controller in FIG. 4.

FIG. 6 illustrates a gate-level diagram of target window controller 482. As shown, target window controller 482 includes OR-gate 601, AND-gate 602, NOR-gate 603, multiplexer 604, and flip-flop 605. OR-gate 601 receives as inputs TRDY signal, DEVSEL signal, and inverted FRAME signal. Accordingly, when any or all of the following scenario occurs: TRDY signal is asserted HIGH, or DEVSEL signal is asserted HIGH, or FRAME signal is asserted LOW, OR-gate 601 provides a HIGH output signal. In so doing, OR-gate 601 indicates whether a bus target is ready for a transaction, whether a device connected to the bus has been selected, or whether a bus transaction is occurring. The output of OR-gate 601 is provided as an input to AND-gate 602. AND-gate 602 also receives signals Trmin_stop_master and Trmin_stop as other inputs. As such, AND-gate 602 will output a LOW signal when any of its input signal is LOW. More particularly, AND-gate 602 outputs a LOW signal when either signal Trmin_stop_master or signal Trmin_stop is LOW indicating that the bus transaction is terminated. NOR-gate 603 receives as input bus transaction signal FRAME and address valid signal addr_vld_n. Because bus transaction signal FRAME is asserted LOW when there is a bus transaction and address valid signal addr_vld_n is asserted LOW when the address data (for a selected device) is verified by address range decoder 692 to be valid, NOR-gate 603 provides a HIGH output only when there is a bus transaction and the address data is valid.

The outputs of NOR-gate 603 and AND-gate 602 are supplied as inputs to multiplexer 604. Multiplexer 604 is controlled by signal pci_tx_termin. Signal pci_tx_termin is the output of flip-flop 605 which receives the output of multiplexer 604 and is clocked by system clock signal CLK. Flip-flop 605 can be reset by RESET signal. In so doing, signal pci_tx_termin is LOW when there is no bus transaction, the address data for the selected device is not valid, or the bus transaction is terminated.

Figure 7:
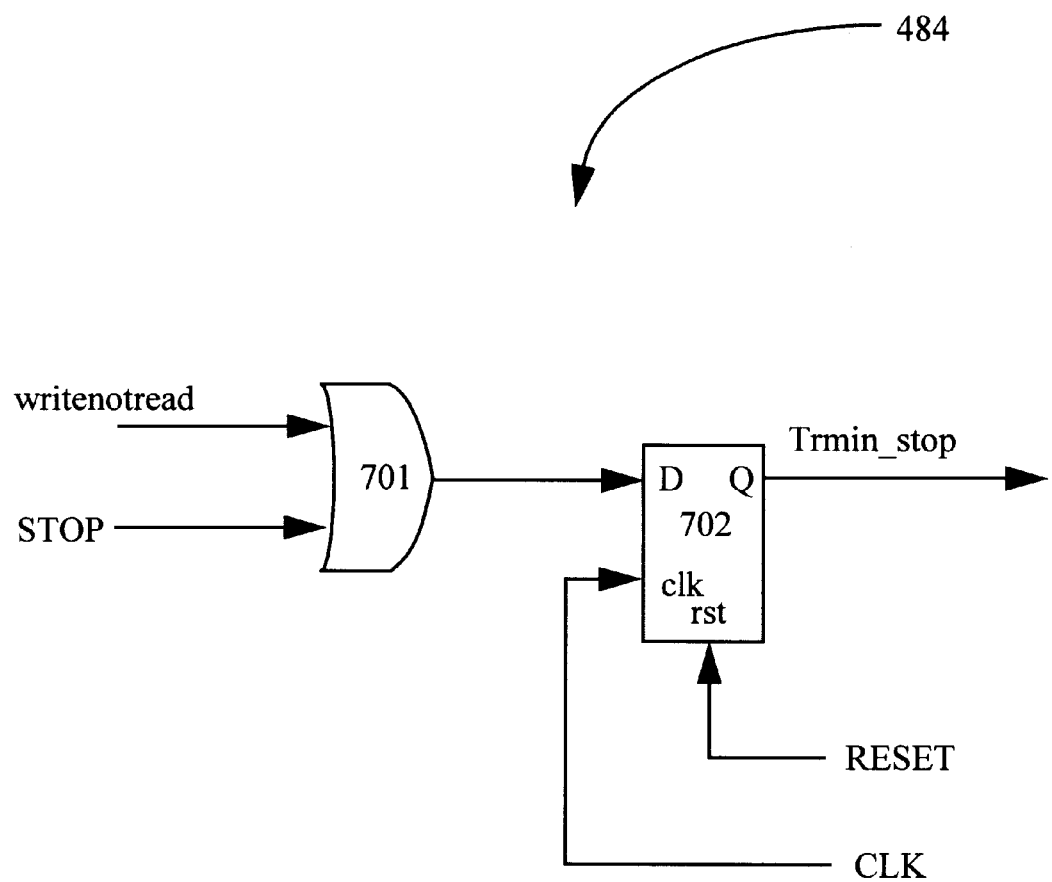
FIG. 7 is a gate-level schematic of the target mode window closer in FIG. 4.

Reference is now made to FIG. 7 illustrating a gate-level diagram of target mode window closer 484. Target mode window closer 484 includes OR-gate 701 and flip-flop 702. OR-gate 701 receives as inputs writenotread signal indicating whether the current bus transaction is a read or a write transaction and STOP signal indicating that the current bus transaction is in its last clock cycle. The output of OR-gate 701 is provided as input to flip-flop 702 which is clocked by system clock signal CLK and reset by RESET signal. Flip-flop 702 provides signal Trmin_stop as its output. In so doing, target mode window carries out the following logic: if the bus transaction is a write transaction (a HIGH writenotread signal), the window is open for the entire bus transaction. Otherwise if the bus transaction is a read transaction (a LOW writenotread), the window needs to be closed starting at the next clock cycle so that the PCI bus can be floated for data to be read. Also, if the current bus transaction is in its last clock cycle (a LOW STOP signal), the window needs to be closed starting at the next clock cycle. When the window needs to be closed, signal Trmin_stop is asserted LOW.

Figure 8:
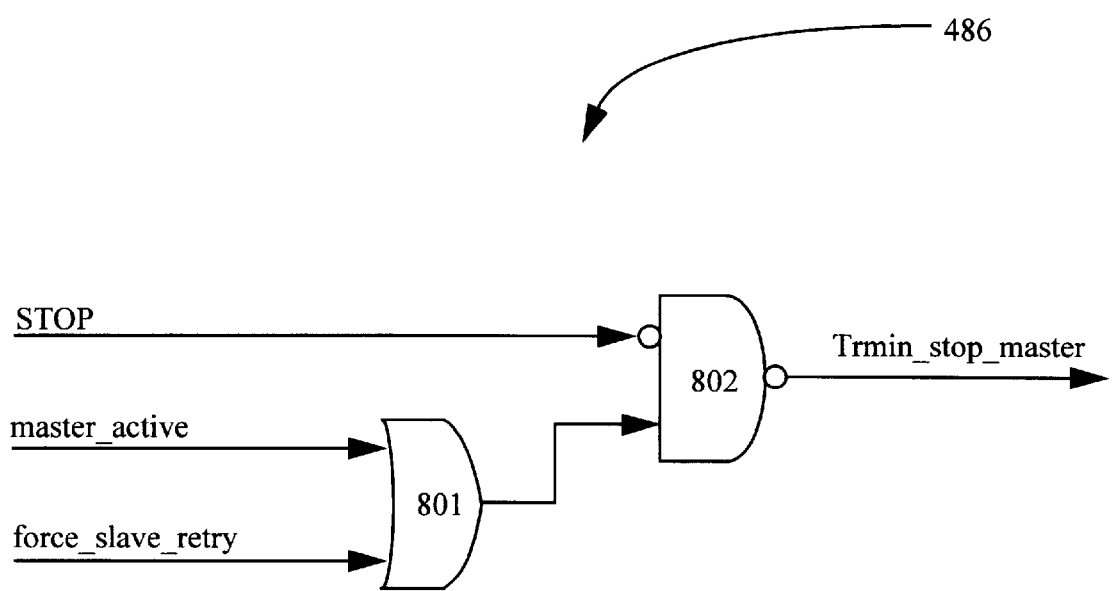
FIG. 8 is a gate-level schematic of the master mode window closer in FIG. 4.

FIG. 8 illustrates a gate-level diagram of master mode window closer 486 which consists of an OR-gate 801 and a NAND-gate 802. OR-gate 801 receives as inputs master_active signal and force_slave_retry signal. OR-gate 801 assures that a HIGH output is provided if master_active signal is HIGH indicating that there is a bus master is ready to initiate a transaction or if force_slave_retry signal is HIGH indicating that other devices seeking to gain control of the bus mastership. The output of OR-gate 801 is provided as an input to NAND-gate 802. NAND-gate 802 receives an inverted STOP signal as a second input. Hence, NAND-gate 802 outputs a LOW Trmin_stop_master signal when the current device is a bus master and the current bus transaction is in its last clock cycle.

Figure 9:
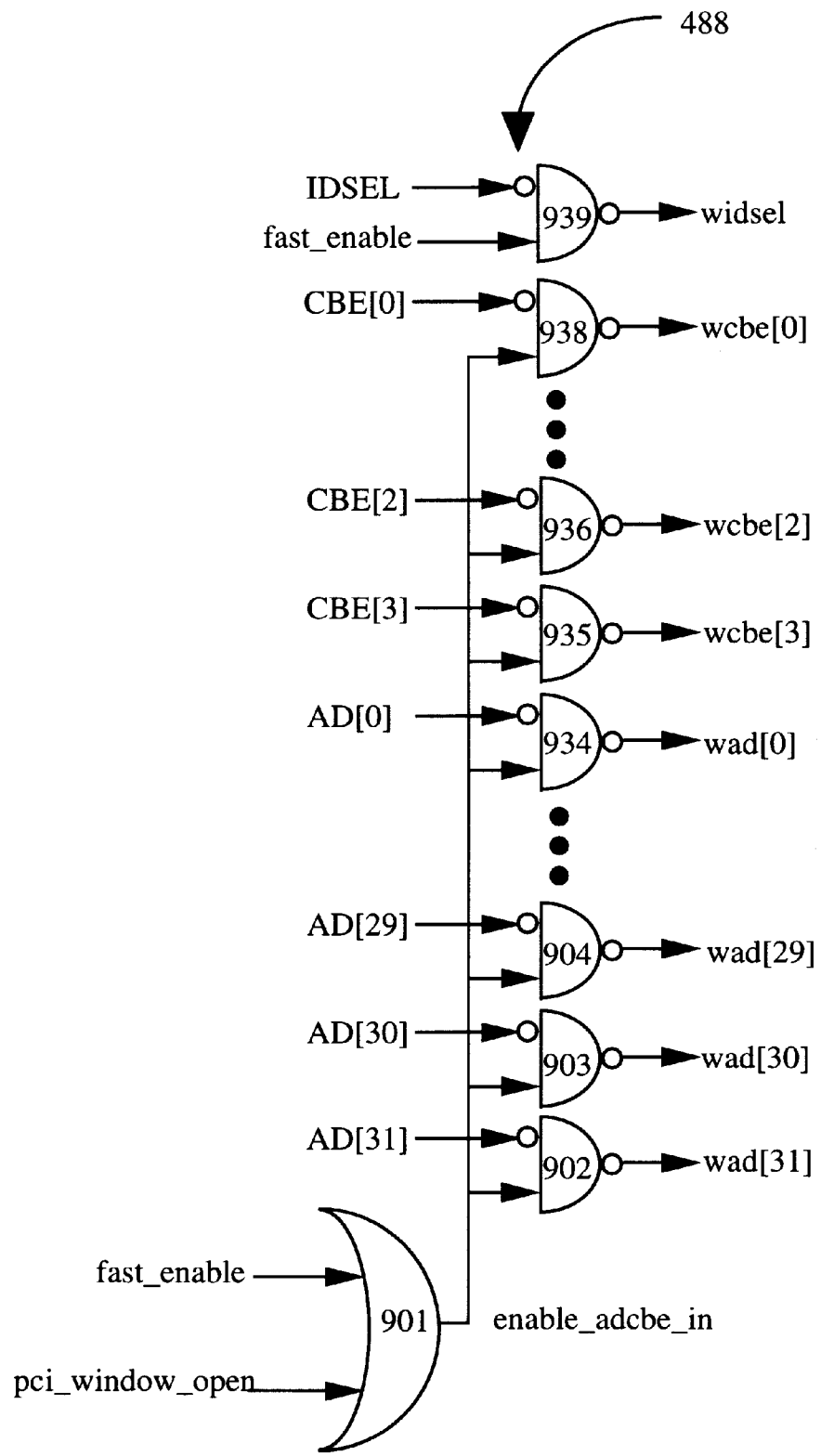
FIG. 9 is a gate-level schematic of the window hardware circuit in FIG. 4.

FIG. 9 illustrates a gate level diagram of window hardware 488. Window hardware 488 consists of OR-gate 901 and NAND-gates 902–939. OR-gate 901 receives as inputs signals fast_enable and pci_window_open. OR-gate 901 assures that a HIGH output is provided if either fast_enable signal or pci_window_open is HIGH indicating that the window should be open. The output of OR-gate 901 is provided as an input to NAND-gates 902–938. NAND-gates 902–934 receive inverted address & data AD signal bits as other inputs. As such, NAND-gates 902–934 allow the address & data AD signals through as their output when either fast_enable signal or pci_window_open signal is HIGH. Similarly, NAND-gates 935–938 receive inverted command & byte enable CBE signal bits as other inputs. As such, NAND-gate 935–938 allow the address & data AD signals through as their output when either fast_enable signal or pci_window_open signal is HIGH. NAND-gate 939 receives as inputs fast_signal and the invert of device identification select signal IDSEL. NAND-gate 903 allows signal IDSEL to pass through when fast_enable signal is HIGH.

Figure 10:
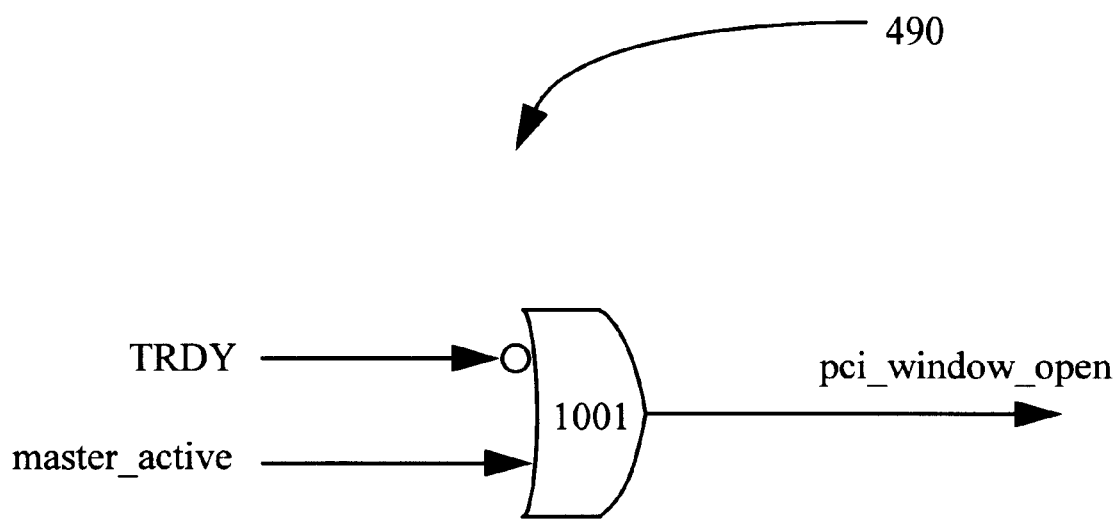
FIG. 10 is a gate-level schematic of the master window controller in FIG. 4.

FIG. 10 illustrates a gate-level diagram of master window controller 490 which simply consists of OR-gate 1001. OR-gate 1001 receives as inputs master_active signal and the invert of target ready signal TRDY. OR-gate 1001 outputs signal pci_window_open. As long as master_active signal is HIGH indicating the current device is a bus master or target ready signal TRDY is LOW indicating that a bus target is ready, the window should be open. Hence, pci_window_open is asserted HIGH in that case.

Figure 11:
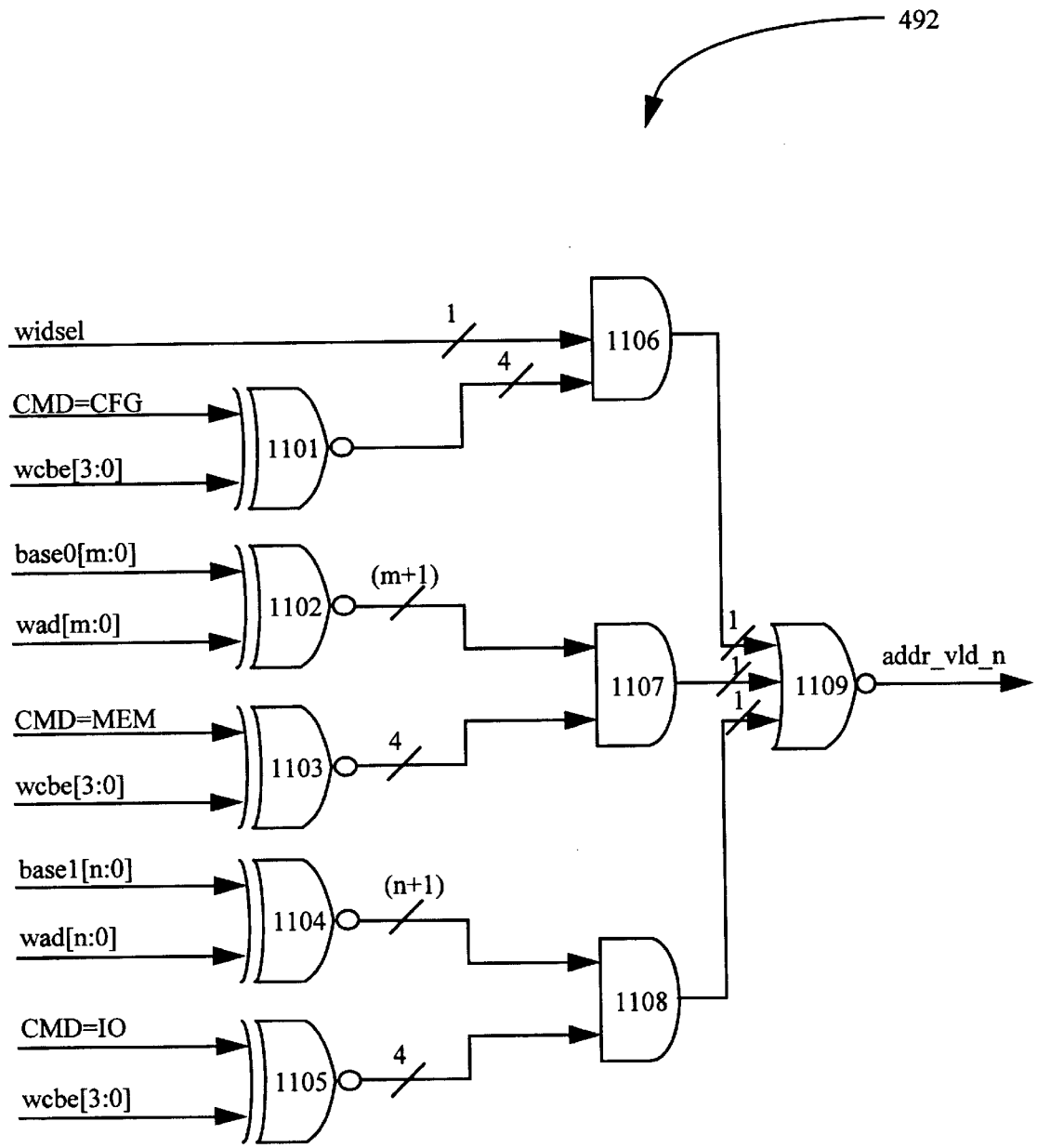
FIG. 11 is a gate-level schematic of the address range decoder in FIG. 4.
Figure 11A:
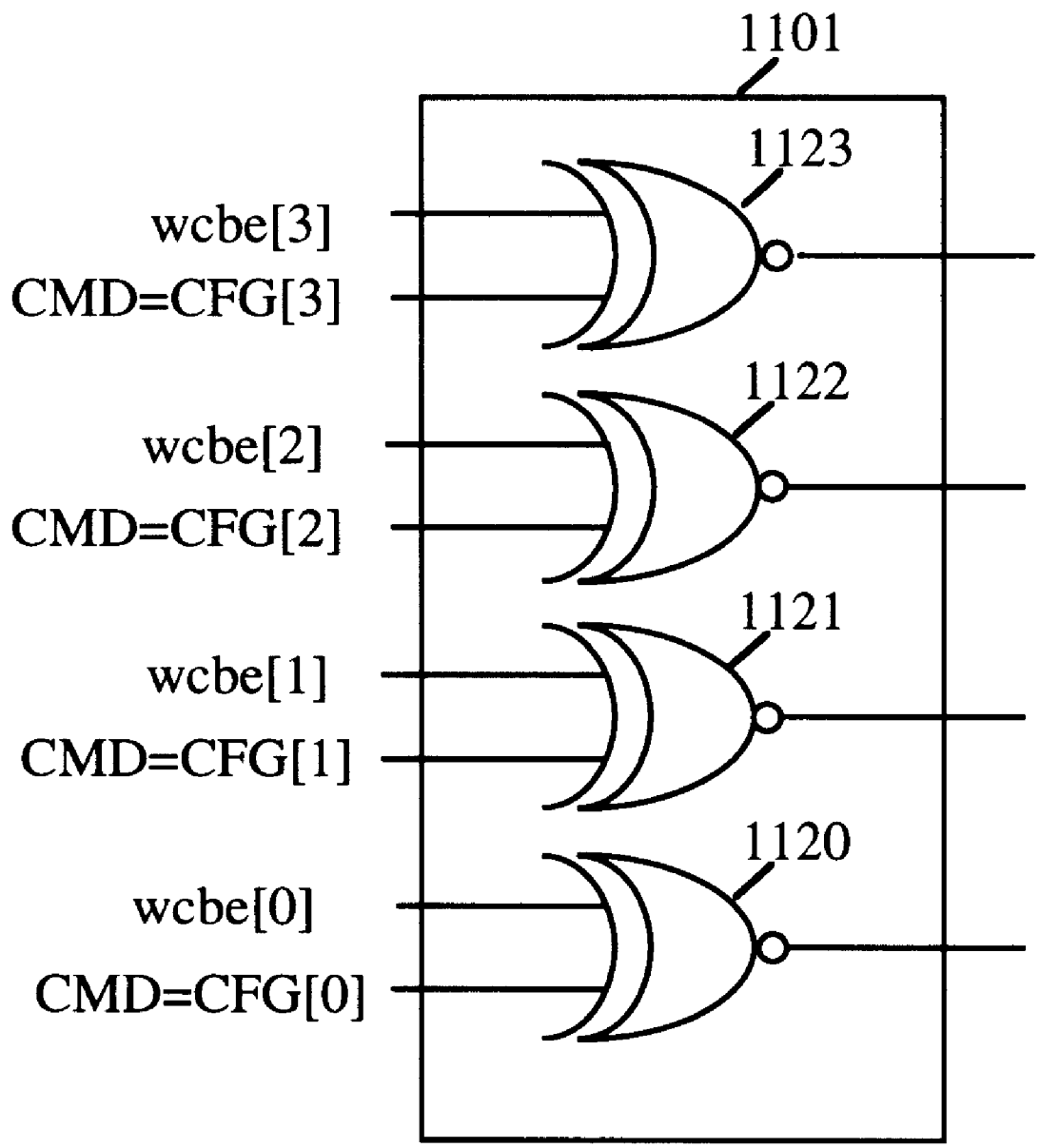
FIG. 11A is a gate-level schematic of the exclusive NOR-gate cluster 1101 of FIG. 11.

FIG. 11 illustrates a gate-level diagram of address range decoder 492. Address range decoder 492 consists of exclusive NOR-gate clusters 1101–1105, AND-gate 1106, and AND-gate clusters 1107–1108, and OR-gate 1109. As shown in FIG. 11A, exclusive NOR-gate cluster 1101 consists of four NOR-gates (1120–1123). Each exclusive NOR-gate in NOR-gate cluster 1101 receives as inputs a different bit from window command & byte enable signal wcbe and a different bit from a predetermined encoded value indicating the configuration register selected. Each exclusive NOR-gate in cluster 1101 compares the values of the two inputs and outputs a HIGH value only when the two input values are equal. In so doing, exclusive NOR-gate cluster 1101 acts as a comparator that signals when window command & byte enable signal wcbe carries a command signal for a configuration register. Referring back to FIG. 11, the 4-bit output of exclusive NOR-gate cluster 1101 is provided as input to AND-gate 1106. Window identification select signal widsel is also provided as an input to AND-gate 1106. When both signal widsel is asserted HIGH indicating a device connected to the PCI bus has been selected and the 4-bit output from exclusive NOR-gate is HIGH (i.e., all four bits are HIGH), AND-gate 1106 outputs a HIGH value to NOR-gate 1109 which in turns asserts a LOW addr_vld_n signal to indicate that a valid configuration register is selected.

Figure 11B:
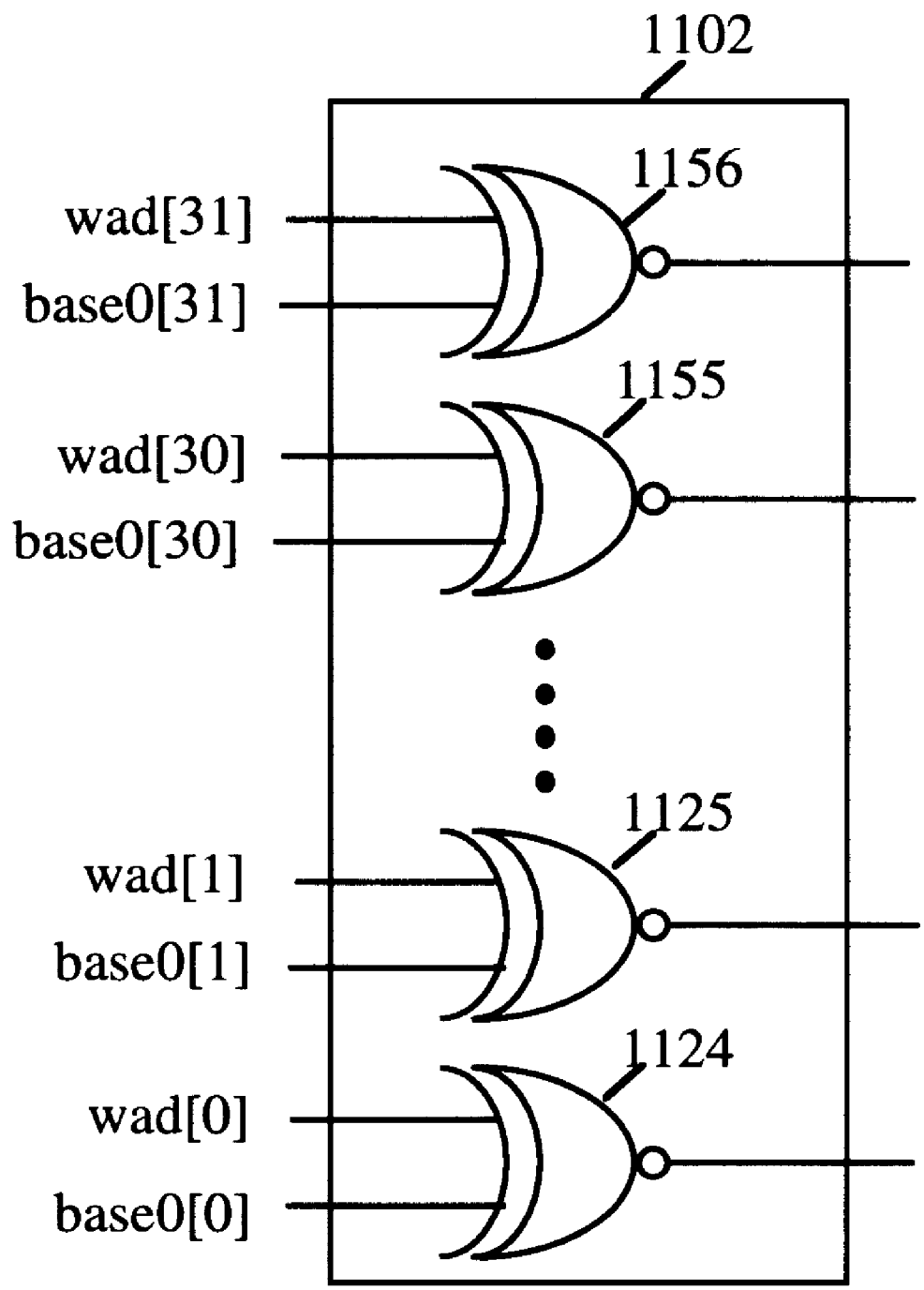
FIG. 11B is a gate-level schematic of the exlcusive NOR-gate cluster 1102 of FIG. 11.
Figure 11C:
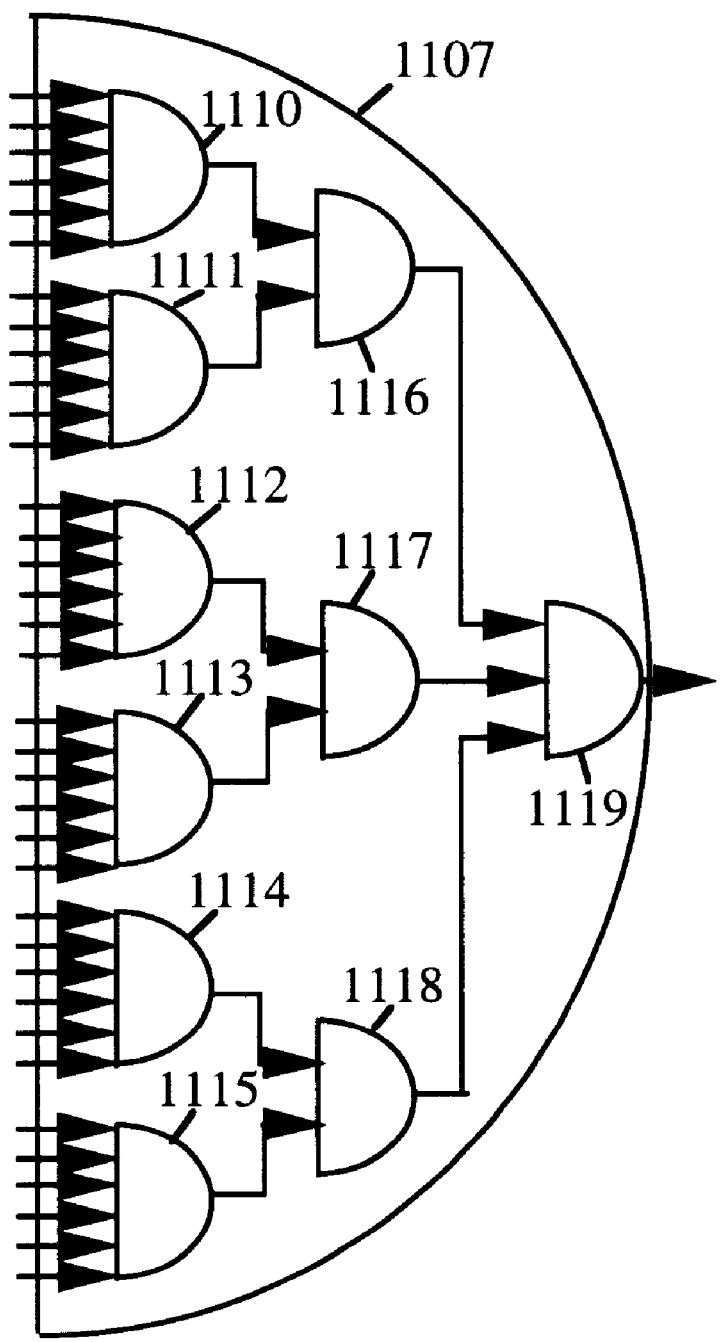
FIG. 11C is a gate-level schematic of the AND-gate cluster 1107 of FIG. 11.

FIG. 11B illustrates, as an example, exclusive NOR-gate cluster 1102. In general, there are (m+1) exclusive NOR-gates in exclusive NOR-gate cluster 1102 where $0 \leq m \leq 31$. For FIG. 11B, however, it is assumed that m is equal to 31. Hence, exclusive NOR-gate cluster 1102 consists of 32 exclusive NOR-gates (1124–1156). Each exclusive NOR-gate in exclusive NOR-gate cluster 1102 receives as inputs a different bit from window address & data signal wad and a different bit from address range base0[31:m] from a configuration register. Each exclusive NOR-gate in cluster 1102 compares the values of the two inputs and outputs a HIGH value only when the two input values are equal. In so doing, exclusive NOR-gate cluster 1102 acts as a comparator that signals when window address & data signal wad carries an address for a device connected to the PCI bus that is in the device's memory address space. Referring back to FIG. 11, exclusive NOR-gate cluster 1103 consists of 4 exclusive NOR-gates connected in a identical fashion as NOR-gates 1120–1123 in FIG. 11A. Each exclusive NOR-gate in cluster 1103 receives a different bit from window command & byte enable signal wcbe and a predetermined encoded value indicating the types of memory operations (e.g., read or write). Each exclusive NOR-gate in cluster 1103 compares the values of the two inputs and outputs a value one (1) only when the two input values are equal. In so doing, exclusive NOR-gate cluster 1103 acts as a comparator that signals when window command & byte enable signal wcbe carries a command signal for the device. The outputs of exclusive NOR-gate clusters 1102 and 1103 are provided as inputs to AND-gate cluster 1107. AND-gate cluster 1107 consists of a number of AND-gates arranged in several levels to serve as an AND logcial function. FIG. 11C illustrates, as an example, AND-gate cluster 1107. In general, (m+1+4) inputs are provided as inputs to AND-gate cluster 1107. For FIG. 11C, however, it is assumed for the sake of convenience that m is equal to 31. Hence, there are 36 inputs of AND-gate cluster 1107 supplied to AND-gates 1110–1115 wherein each AND-gate receives 6 inputs. The outputs of AND-gates 1110–1115 are provided as inputs to AND-gates 1116–1118. The outputs of AND-gates 1116–1118 are provided as inputs to AND-gate 1119 which outputs a single signal that acts as the output of AND-gate cluster 1107. As such the AND-gates in AND-gate cluster 1107 combine to function as one big AND-gate. AND-gate cluster 1107 is well-known in the art.

Referring now back to FIG. 11, AND-gate cluster 1107 provides its output to NOR-gate 1109. When all inputs of AND-gate 1107 are HIGH indicating that the current command involves a valid operations and the current address is valid, NOR-gate 1109 in turns asserts a LOW addr_vld_n signal.

Exclusive NOR-gate 1104 cluster consists of (n+1) exclusive NOR-gates connected in an similar fashion as NOR-gates 1124–1156 in FIG. 11B. Accordingly, for brevity and clarity, exclusive NOR-gate 1104 is not discussed further. Each exclusive NOR-gate in exclusive NOR-gate cluster 1104 receives as inputs a different bit from window address & data signal wad and a different bit from address range base1[31:n]. Each exclusive NOR-gate in cluster 1104 compares the values of the two inputs an outputs a HIGH value only when the two input values are equal. In so doing, exclusive NOR-gate 1104 acts as a comparator that signals when window address & data signal wad carries an address for the device connected to the PCI bus that is in the device's I/O address space. Exclusive NOR-gate cluster 1105 consists of 4 exclusive NOR-gates connected in an identical fashion as NOR-gates 1120–1123 in FIG. 11A. Each exclusive NOR-gate in exclusive NOR-gate cluster 1105 receives as inputs a different bit from window command & byte enable signal wcbe and a predetermined encoded value indicating the types of I/O operations (e.g., read or write). Each exclusive NOR-gate in cluster 1105 compares the values of the two inputs an outputs a value one (1) only when the two input values are zeros. In so doing, exclusive NOR-gate 1105 acts as a comparator that signals when window command & byte enable signal wcbe carries a command signal for an I/O device. The outputs of exclusive NOR-gate clusters 1104 and 1105 are provided as inputs to AND-gate cluster 1108. AND-gate cluster 1108 is similar to AND-gate cluster 1107 shown in FIG. 11C except that (n+1+4) inputs are provided as inputs to AND-gate cluster 1108 where $0 \leq n \leq 31$. Accordingly, for brevity and clarity, AND-gate cluster 1108 is not discussed any further. AND-gate cluster 1108 provides its output to NOR-gate 1109. When both inputs of AND-gate 1107 are HIGH indicating that the current command involves a I/O operations and the current I/O address is valid, NOR-gate 1109 in turns asserts a LOW addr_vld_n signal.

Figure 12:
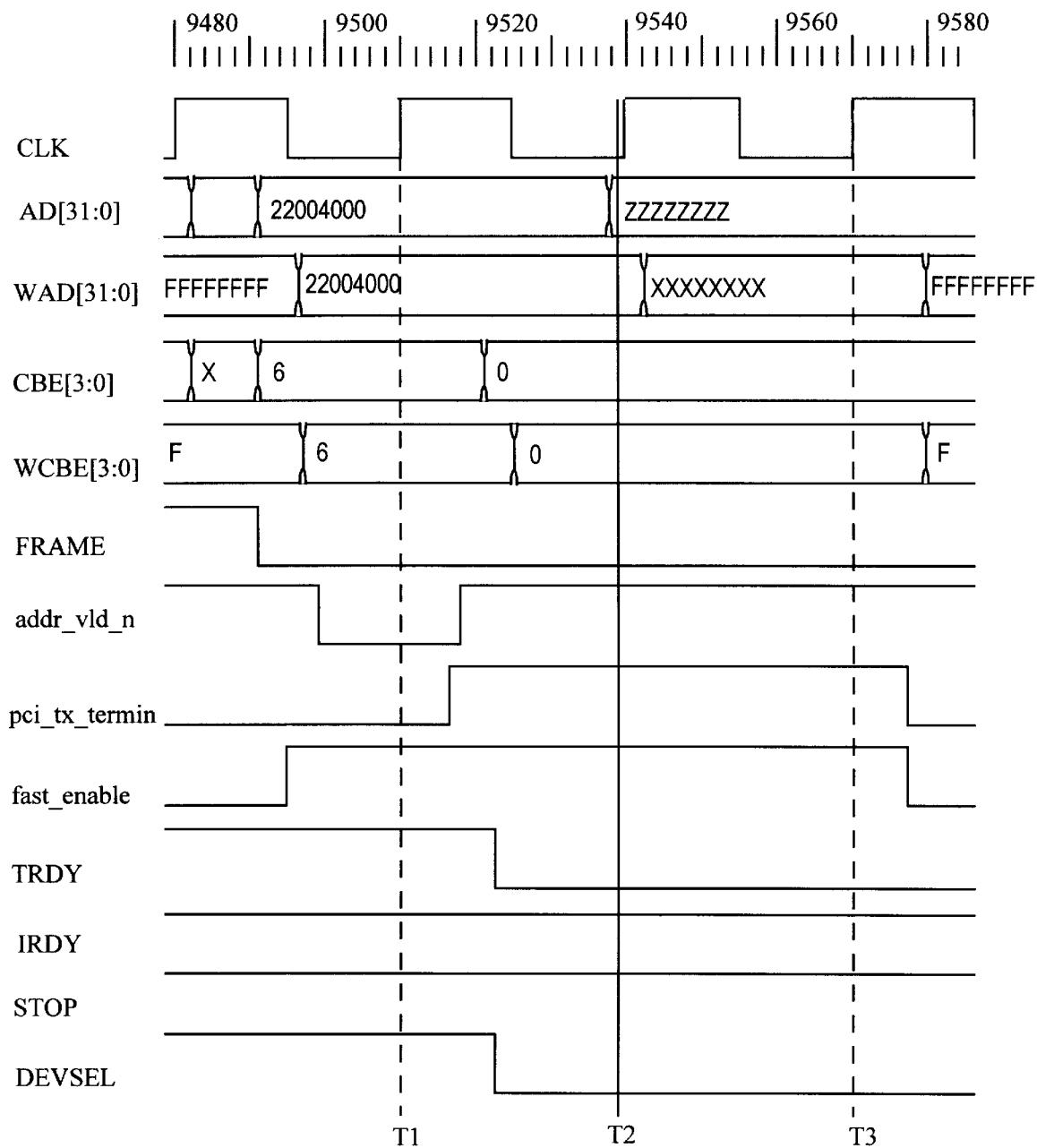
FIG. 12 is a timing diagram for the start of a target read transaction.

Reference is now made to FIG. 12 illustrating a timing diagram for the start of a target read transaction. As shown in FIG. 12, prior to time T1, in response to an asserted LOW FRAME signal, fast opener circuit 480 asserts a HIGH fast_enable signal which triggers window hardware 488 to open its gate to allow the address from address & data signal AD to pass through as window address & data signal WAD. Similarly, the HIGH fast_enable signal triggers window hardware 488 to open its gate to allow command & byte enable signal CBE to pass through to become window command & byte enable signal wcbe. When signal addr_vld_n is subsequently asserted LOW indicating that the address is verified to be a valid address. When a LOW signal addr_vld_n is coupled with a LOW FRAME signal, they trigger target window controller 482 to assert signal pic_tx_termin HIGH. A HIGH signal pic_tx_termin indicates that there is a valid transaction and hence, fast_enable signal is to remain HIGH. During time T2, sufficient information is gathered to determine whether the current transaction is a read transaction. The transaction is a target transaction because target ready signal TRDY is asserted LOW prior to time T2 and initiator ready signal IRDY is kept HIGH all through. By time T3, the command has been decoded to determine that the current transaction is a read transaction and the window should be closed after the bus has been floated for one clock cycle. For this reason, signal pic_tx_termin is asserted LOW at time T3 which triggers the fast_enable signal to go LOW.

Figure 13:
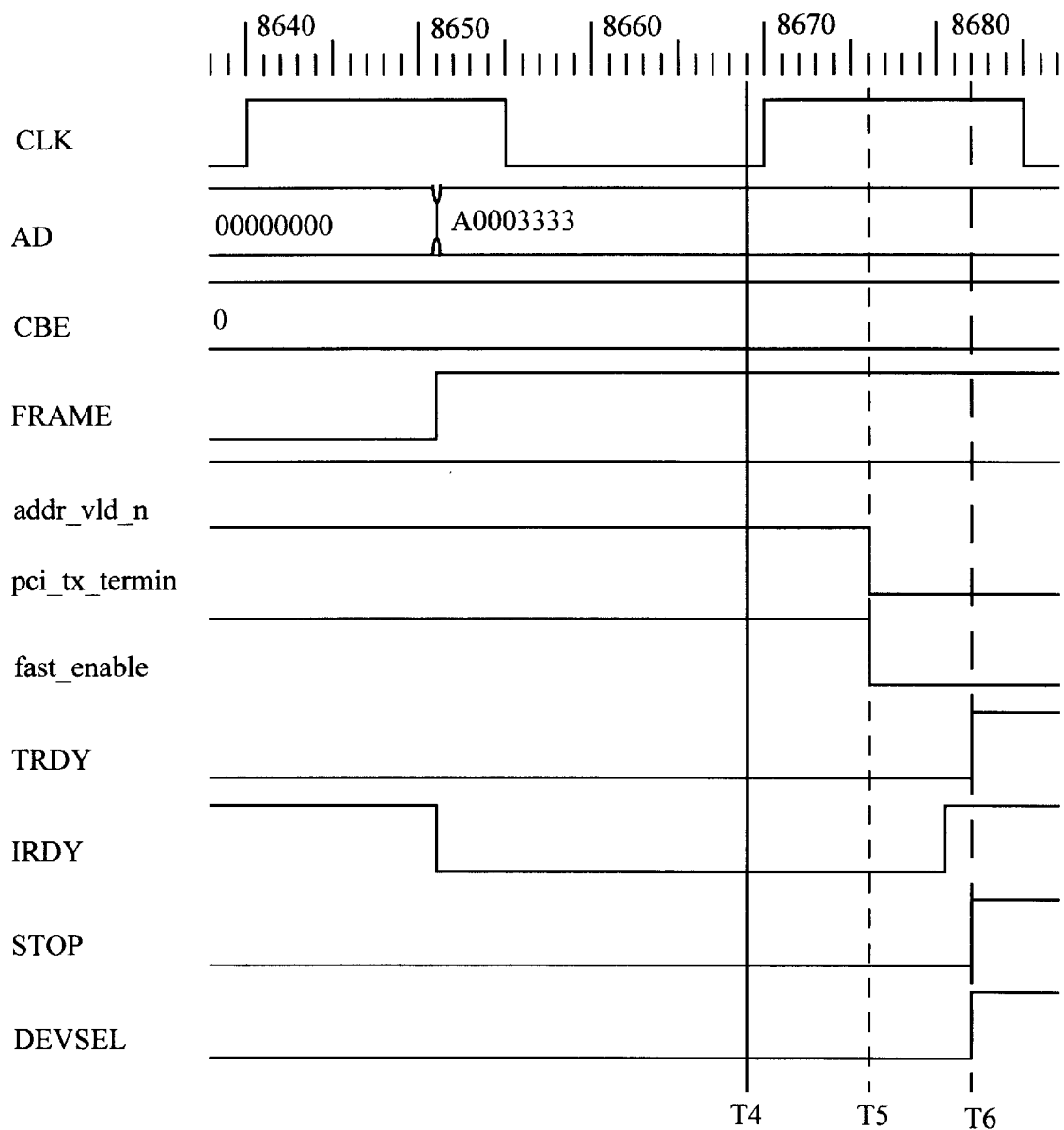
FIG. 13 is a timing diagram for the end of a target transaction.

FIG. 13 illustrates a timing diagram for the end of a target transaction. As shown in FIG. 13, the transaction is a target transaction because target ready signal TRDY is asserted LOW all the way until time T6. Up until time T5, fast opener circuit 480 asserts a HIGH fast_enable signal which triggers window hardware 488 to open its gate to allow the address from address & data signal AD to pass through as window address & data signal WAD. Since this is near the end of a transaction, there is no more command or byte enable information sent. When FRAME signal goes HIGH prior to time T4 indicating there is no transaction on the bus, initiator ready signal IRDY goes LOW to indicate that a master is ready for a transaction. In response, pci_tx_term is asserted LOW at time T5 which triggers fast_enable signal to go LOW to close the window gate at time T6. Near time T6, signal IRDY goes HIGH to indicate that the bus master has completed the transaction.

Figure 14:
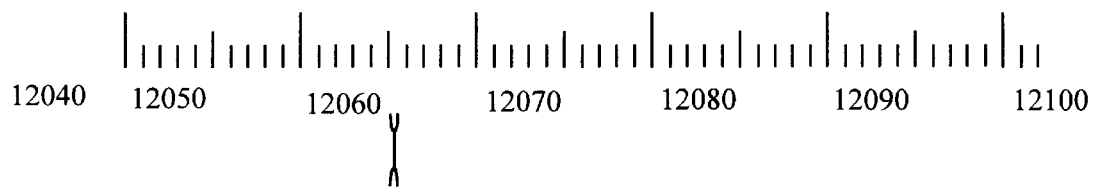
FIG. 14 is a timing diagram for the start of a master read transaction.

FIG. 14 illustrates a timing diagram for the start of a master read transaction initiated by network controller 324. As shown in FIG. 14, starting at time T7, signal master_active is asserted HIGH to indicate that network controller 224 intends to be a master of the bus and is getting ready to initiate a transaction. Subsequent to this, FRAME signal is asserted LOW to indicate that a transaction is occurring on the PCI bus. In response to the asserted LOW FRAME signal, fast opener circuit 480 asserts a HIGH fast_enable signal which triggers window hardware 488 to open its gate to allow the address from address & data signal AD to pass through as window address & data signal WAD. Similarly, the HIGH fast_enable signal triggers window hardware 488 to open its gate to allow command & byte enable signal CBE to pass through to become window command & byte enable signal wcbe. Because the current transaction is a read transaction, in response to signal Trmin_stop being asserted LOW, fast_enable signal goes LOW just prior to time T8 to close the window gate starting at the next clock cycle. Subsequent to time T8, signal DEVSEL is asserted LOW to indicate a device from which information is to be retrieved. Signal initiator ready IRDY is then asserted LOW to signify that the bus master is ready for a transaction (e.g., retrieve data from a target). Just prior to time T9, target ready signal TRDY is asserted LOW to indicate that the bus target is now ready for data transfer. Enable_adcbe_in is derrived from signal pci_window_open and fast_enable as shown in FIG. 9. As can be seen in FIG. 14, enable_adcbe_in is first turned on HIGH then pulled LOW during the time signal FRAME is LOW. Signal internalAD[31:0] shows "xxxx" information propagting in from the periphery of the chip, but window hardware circuit 488 prevents these information from propagating inside as can be seen on signal WAD[31:0] and WCBE[3:0].

Figure 15:
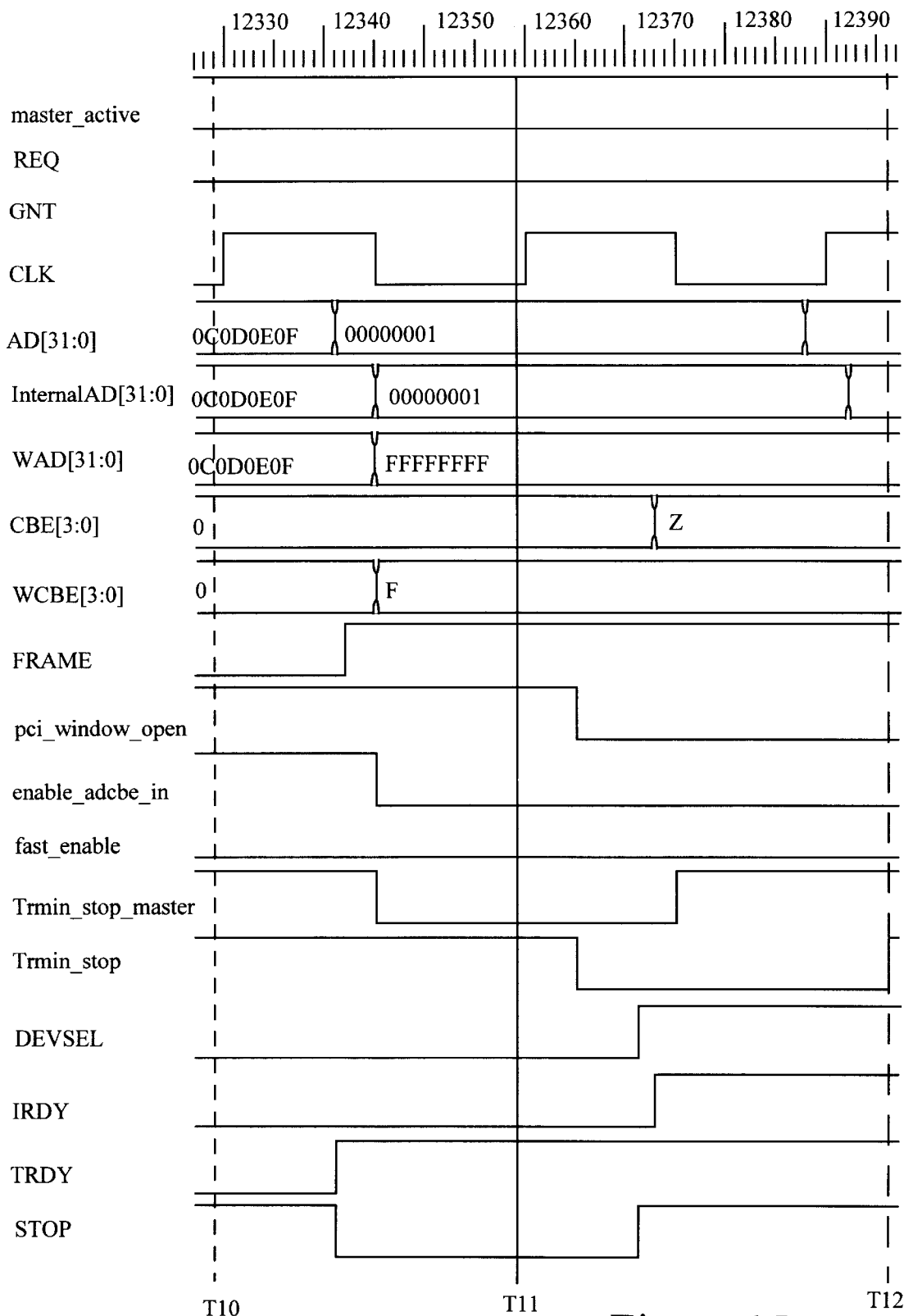
FIG. 15 is a timing diagram for the end of a master write transaction.

FIG. 15 illustrates a timing diagram for the end of a burst write, master transaction of network controller 324. As shown in FIG. 15, prior to time T10, signal master_active is asserted HIGH to indicate that network controller 224 intends to be a master of the bus and is getting ready to terminate the current transaction. Subsequent to this, target ready signal TRDY is asserted HIGH to indicate that the target is not ready for data retrieval. Additionally, STOP signal is asserted LOW to indicate the end of the current transaction cycle. When signal STOP is asserted LOW, it triggers signal termin_stop_master to assert an immediate LOW as can be seen from the logic in FIG. 8 followed by signal termin_stop being triggered to be asserted LOW for the next clock as can be seen from the logic in FIG. 7. These two signals trigger signal pic_tx_termin to be de-asserted and keep window hardware 488 closed at the end of the transaction.

The preferred embodiment of the present invention, a window mechanism to prevent invalid data from propagating into a device connected to a PCI tristate bus, is thus described. While the present invention has been described in particular embodiments, the present invention should not be construed as limited by such embodiments, but rather construed according to the below claims.

What is claimed is:

1. An apparatus connected to a computer bus for controlling information transfer in and out of a device comprising:
   a window hardware circuit coupled to the computer bus, the window hardware circuit allowing address, data, command, byte enable, and device identification information to pass through as outputs to the device in response to a first and a second control signal;
   an address decoder coupled to the window hardware circuit and the computer bus for generating a signal indicating whether an address output from the window hardware circuit is valid;
   a target mode window closer coupled to the computer bus, the target mode window closer receiving a signal indicating whether a transaction is a write or read transaction, the target mode window closer generating a first internal stop signal in response to when the transaction is complete or in response to when the transaction is a read transaction;
   a master mode window closer coupled to the computer bus, the master mode window closer receiving a signal indicating whether there is an active bus master, the master mode window closer generating a second internal stop signal in response to when there is an active bus master or in response to when there is at least another device contending for control of the computer bus;
   a target window controller coupled to the computer bus, the address decoder, the target mode window closer, and the master mode window closer, the target window controller generating a third internal stop signal in response to the first internal stop signal, in response to the second internal stop signal, or in response to when the address output from the window hardware circuit is not valid;
   a fast opener circuit coupled to the computer bus, the target window controller, and the window hardware, in response to the third internal stop signal, the fast opener circuit generating the first control signal to the window hardware; and
   a master window controller coupled to the computer bus and the window hardware, the master window controller receiving the signal indicating whether there is an active bus master, in response, the master window controller generating the second control signal to the window hardware.

2. The apparatus of claim 1, wherein the address decoder determining from command information outputted from the window hardware circuit whether a transaction involves a configuration register, a memory device, or an input/output (I/O) device, the address decoder determining from address information outputted from the window hardware circuit whether a memory device involved in the transaction has a valid address, the address decoder determining from the address information outputted from the window hardware circuit whether an I/O device involved in the transaction has a valid address.

3. The apparatus of claim 2, wherein the address decoder comprising:
   a first exclusive NOR-gate cluster receiving as inputs a signal carrying command information and a signal carrying information that is substantially similar to a code for a configuration register operation command, the first exclusive NOR-gate cluster serving an exclusive NOR logic function;
   a second exclusive NOR-gate cluster receiving as inputs a signal carrying address information and a signal carrying memory address range information, the second exclusive NOR-gate cluster serving an exclusive NOR logic function;
   a third exclusive NOR-gate cluster receiving as inputs the signal carrying command information and a signal carrying information that is substantially similar to a code for a memory operation command, the third exclusive NOR-gate cluster serving an exclusive NOR logic function;
   a fourth exclusive NOR-gate cluster receiving as inputs a signal carrying address information and a signal carrying I/O address range information, the fourth exclusive NOR-gate cluster serving an exclusive NOR logic function;
   a fifth exclusive NOR-gate cluster receiving as inputs the signal carrying command information and a signal carrying information that is substantially similar to a code for an I/O operation command, the fifth exclusive NOR-gate cluster serving an exclusive NOR logic function;

a first AND-gate receiving as inputs a signal carrying identification select information and an output from the first exclusive NOR-gate cluster;

a first AND-gate cluster receiving as inputs an output from the second exclusive NOR-gate cluster and an output from the third exclusive NOR-gate cluster, the first AND-gate cluster serving an AND logic function;

a second AND-gate cluster receiving as inputs an output from the fourth exclusive NOR-gate cluster and an output from the fifth exclusive NOR-gate cluster, the second AND-gate cluster serving an AND logic function; and a first NOR-gate receiving as inputs an output from the first AND-gate, an output from the first AND-gate cluster, and an output from the second AND-gate cluster, the first NOR-gate generating as output the signal indicating whether an address output from the window hardware circuit is valid.

4. The apparatus of claim 3, wherein the first exclusive NOR-gate cluster comprising four exclusive NOR-gates, each of the four exclusive NOR-gate receiving as inputs a different bit of the signal carrying command information and a different bit of the signal carrying information that is substantially similar to a code for a configuration register operation command.

5. The apparatus of claim 3, wherein the second exclusive NOR-gate cluster comprising (m+1) exclusive NOR-gates where $0 \leq m \leq 31$, each of the (m+1) exclusive NOR-gates receiving as inputs a different bit of the signal carrying address information and a different bit of the signal carrying memory address range information.

6. The apparatus of claim 3, wherein the third exclusive NOR-gate cluster comprising four exclusive NOR-gates, each of the four exclusive NOR-gate receiving as inputs a different bit of the signal carrying command information and a different bit of the signal carrying information that is substantially similar to a code for a memory operation command.

7. The apparatus of claim 3, wherein the fourth exclusive NOR-gate cluster comprising (n+1) exclusive NOR-gates where $0 \leq n \leq 31$, each of the (n+1) exclusive NOR-gates receiving as inputs a different bit of the signal carrying address information and a different bit of the signal carrying I/O address range information.

8. The apparatus of claim 3, wherein the fifth exclusive NOR-gate cluster comprising four exclusive NOR-gates, each of the four exclusive NOR-gate receiving as inputs a different bit of the signal carrying command information and a different bit of the signal carrying information that is substantially similar to a code for an I/O operation command.

9. The apparatus of claim 3, wherein the first and second AND-gate clusters each comprising at most ten AND-gates, the ten AND-gates are arranged in three levels, there are at most six AND-gates in a first level, there are at most three AND-gates in a second level, and there is one AND-gate in a third level, each of the at most six AND-gates in the first level of the first AND- gate cluster receiving at most six inputs from the outputs of the second exclusive NOR-gate cluster and the third exclusive NOR- gate cluster, each of the at most six AND-gates in the first level of the second AND-gate cluster receiving at most six inputs from the outputs of the fourth exclusive NOR-gate cluster and the fifth exclusive NOR-gate cluster, each of the at most three AND-gates in the second level receiving inputs from at most two of the six AND-gates in the first level, the AND-gate in the third level receiving inputs from the at most three AND-gates in the second level.

10. The apparatus of claim 3, wherein the target mode window closer comprising:

a first OR-gate receiving as inputs the signal indicating whether a transaction is a write or read transaction and control information from the computer bus indicating whether the transaction is complete; and a first register device receiving as inputs an output from the first OR-gate, a clock signal from the computer bus, and a reset signal from the computer bus, the register outputting the first internal stop signal.

11. The apparatus of claim 10, wherein the master mode window closer comprising:

a second OR-gate receiving as inputs the signal indicating whether there is an active bus master; and a first NAND-gate receiving as inputs inverted control information from the computer bus indicating whether the transaction is complete and an output from the second OR-gate, the master mode window closer outputting the second internal stop signal.

12. The apparatus of claim 11, wherein the target window controller comprising:

a third OR-gate receiving as inputs control information from the computer bus indicating whether a target device is ready for a transaction, control information from the computer bus indicating whether a device has been selected, and control information from the computer bus indicating whether a transaction is occurring;

a second AND-gate receiving as inputs the first internal stop signal from the target mode window closer, the second internal stop signal from the master mode window closer, and an output from the second OR-gate;

a second NOR-gate receiving as inputs control information from the computer bus indicating whether a transaction is occurring and the signal indicating whether an address output from the window hardware circuit is valid;

a multiplexer receiving as input outputs from the second AND-gate and the second NOR-gate; and a second register device receiving as inputs an output of the multiplexer, a clock signal, and a RESET signal, the register device outputting the third internal stop signal, wherein the third internal stop signal is used as a select signal for the multiplexer.

13. The apparatus of claim 12, wherein the fast opener circuit comprising:

a third register device receiving as inputs control information from the computer bus indicating whether a transaction is occurring, a clock signal from the computer bus, and a reset signal from the computer bus;

a fourth OR-gate receiving as inputs the control information from the computer bus indicating whether a transaction is occurring and an output from the third register device; and a fifth OR-gate receiving as inputs an inverted output from the fourth OR-gate and the third internal stop signal from the target window controller, the fifth OR-gate generating the first control signal.

14. The apparatus of claim 13, wherein the master window controller comprising a sixth OR-gate receiving as inputs control information from the computer bus indicating whether a target device is ready for a transaction and the signal indicating whether there is an active bus master, the master window controller generating the second control signal.

15. The apparatus of claim 14, wherein the window hardware circuit comprising:

a second NAND-gate receiving as inputs identification select information from the computer bus and the first control signal from the fast opener circuit, the second NAND-gate outputting a signal carrying window identification select information;

a fifth OR-gate receiving as inputs the first control signal from the fast opener circuit and the second control signal from the master window controller;

a first NAND-gate cluster receiving as inputs address, data, command, and byte enable information from the computer bus and an output of the sixth NOR-gate, the first NAND-gate cluster serving a NAND logic function, the first NAND-gate cluster outputting signals carrying window address, window data, window command, and window byte enable information.

16. The apparatus of claim 15, wherein the first NAND-gate cluster comprising thirty-six NAND-gates, each of the thirty-six NAND-gates receiving as input the output from the seventh NAND-gate, thirty-two of the thirty-six NAND-gates receiving as input a different bit of address information from the computer bus, four of the thirty-six NAND-gates receiving as input a different bit of command information from the computer bus.

17. The apparatus of claim 15 wherein the computer bus is a peripheral component interconnect (PCI) local bus.

18. A computer system comprising:

a host processor;

a system memory;

a bus coupling the host processor to said system memory; and a network controller connected to the bus, the network controller having an apparatus to control information transfer between the network controller and the bus, the apparatus comprising:

a window hardware circuit coupled to the computer bus, the window hardware circuit allowing address, data, command, byte enable, and device identification information to pass through as outputs to the device in response to a first and a second control signal;

an address decoder coupled to the window hardware circuit and the computer bus for generating a signal indicating whether an address output from the window hardware circuit is valid;

a target mode window closer coupled to the computer bus, the target mode window closer receiving a signal indicating whether a transaction is a write or read transaction, the target mode window closer generating a first internal stop signal in response to when the transaction is complete or in response to when the transaction is a read transaction;

a master mode window closer coupled to the computer bus, the master mode window closer receiving a signal indicating whether there is an active bus master, the master mode window closer generating a second internal stop signal in response to when there is an active bus master or in response to when there is at least another device contending for control of the computer bus;

a target window controller coupled to the computer bus, the address decoder, the target mode window closer, and the master mode window closer, the target window controller generating a third internal stop signal in response to the first internal stop signal, in response to the second internal stop signal, or in response to when the address output from the window hardware circuit is not valid;

a fast opener circuit coupled to the computer bus, the target window controller, and the window hardware, in response to the third internal stop signal, the fast opener circuit generating the first control signal to the window hardware; and a master window controller coupled to the computer bus and the window hardware, the master window controller receiving the signal indicating whether there is an active bus master, in response, the master window controller generating the second control signal to the window hardware.

19. The computer system of claim 18, wherein the address decoder determining from command information outputted from the window hardware circuit whether a transaction involves a configuration register, a memory device, or an input/output (I/O) device, the address decoder determining from address information outputted from the window hardware circuit whether a memory device involved in the transaction has a valid address, the address decoder determining from the address information outputted from the window hardware circuit whether an I/O device involved in the transaction has a valid address.

20. The computer system of claim 19, wherein the address decoder comprising:

a first exclusive NOR-gate cluster receiving as inputs a signal carrying command information and a signal carrying information that is substantially similar to a code for a configuration register operation command, the first exclusive NOR-gate cluster serving an exclusive NOR logic function;

a second exclusive NOR-gate cluster receiving as inputs a signal carrying address information and a signal carrying memory address range information, the second exclusive NOR-gate cluster serving an exclusive NOR logic function;

a third exclusive NOR-gate cluster receiving as inputs the signal carrying command information and a signal carrying information that is substantially similar to a code for a memory operation command, the third exclusive NOR-gate cluster serving an exclusive NOR logic function;

a fourth exclusive NOR-gate cluster receiving as inputs a signal carrying address information and a signal carrying I/O address range information, the fourth exclusive NOR-gate cluster serving an exclusive NOR logic function;

a fifth exclusive NOR-gate cluster receiving as inputs the signal carrying command information and a signal carrying information that is substantially similar to a code for an I/O operation command, the fifth exclusive NOR-gate cluster serving an exclusive NOR logic function;

a first AND-gate receiving as inputs a signal carrying identification select information and an output from the first exclusive NOR-gate cluster;

a first AND-gate cluster receiving as inputs an output from the second exclusive NOR-gate cluster and an output from the third exclusive NOR-gate cluster, the first AND-gate cluster serving an AND logic function;

a second AND-gate cluster receiving as inputs an output from the fourth exclusive NOR-gate cluster and an output from the fifth exclusive NOR-gate cluster, the second AND-gate cluster serving an AND logic function; and a first OR-gate receiving as inputs an output from the first AND-gate, an output from the first AND-gate cluster, and an output from the second AND-gate cluster, the first NOR-gate generating as output the signal indicating whether an address output from the window hardware circuit is valid.

21. The computer system of claim 20, wherein the first exclusive NOR-gate cluster comprising four exclusive NOR-gates, each of the four exclusive NOR-gate receiving as inputs a different bit of the signal carrying command information and a different bit of the signal carrying information that is substantially similar to a code for a configuration register operation command.

22. The computer system of claim 20, wherein the second exclusive NOR-gate cluster comprising (m+1) exclusive NOR-gates where $0 \leq m \leq 31$, each of the (m+1) exclusive NOR-gates receiving as inputs a different bit of the signal carrying address information and a different bit of the signal carrying memory address range information.

23. The computer system of claim 20, wherein the third exclusive NOR-gate cluster comprising four exclusive NOR-gates, each of the four exclusive NOR-gate receiving as inputs a different bit of the signal carrying command information and a different bit of the signal carrying information that is substantially similar to a code for a memory operation command.

24. The computer system of claim 20, wherein the fourth exclusive NOR-gate cluster comprising (n+1) exclusive NOR-gates where $0 \leq n \leq 31$, each of the (n+1) exclusive NOR-gates receiving as inputs a different bit of the signal carrying address information and a different bit of the signal carrying I/O address range information.

25. The computer system of claim 20, wherein the fifth exclusive NOR-gate cluster comprising four exclusive NOR-gates, each of the four exclusive NOR-gate receiving as inputs a different bit of the signal carrying command information and a different bit of the signal carrying information that is substantially similar to a code for an I/O operation command.

26. The computer system of claim 20, wherein the first and second AND-gate clusters each comprising at most ten AND-gates, the ten AND-gates are arranged in three levels, there are at most six AND-gates in a first level, there are at most three AND-gates in a second level, and there is one AND-gate in a third level, each of the at most six AND-gates in the first level of the first AND-gate cluster receiving at most six inputs from the outputs of the second exclusive NOR-gate cluster and the third exclusive NOR-gate cluster, each of the at most six AND-gates in the first level of the second AND-gate cluster receiving at most six inputs from the outputs of the fourth exclusive NOR-gate cluster and the fifth exclusive NOR-gate cluster, each of the at most three AND-gates in the second level receiving inputs from at most two of the six AND-gates in the first level, the AND-gate in the third level receiving inputs from the at most three AND-gates in the second level.

27. The computer system of claim 20, wherein the target mode window closer comprising:
  a first OR-gate receiving as inputs the signal indicating whether a transaction is a write or read transaction and control information from the computer bus indicating whether the transaction is complete; and
  a first register device receiving as inputs an output from the first OR-gate, a clock signal from the computer bus, and a reset signal from the computer bus, the register outputting the first internal stop signal.

28. The computer system of claim 27, wherein the master mode window closer comprising:
  a second OR-gate receiving as inputs the signal indicating whether there is an active bus master; and
  a first NAND-gate receiving as inputs inverted control information from the computer bus indicating whether the transaction is complete and an output from the second OR-gate, the master mode window closer outputting the second internal stop signal.

29. The computer system of claim 28, wherein the target window controller comprising:
  a third OR-gate receiving as inputs control information from the computer bus indicating whether a target device is ready for a transaction, control information from the computer bus indicating whether a device has been selected, and control information from the computer bus indicating whether a transaction is occurring;
  a second AND-gate receiving as inputs the first internal stop signal from the target mode window closer, the second internal stop signal from the master mode window closer, and an output from the second OR-gate;
  a second NOR-gate receiving as inputs control information from the computer bus indicating whether a transaction is occurring and the signal indicating whether an address output from the window hardware circuit is valid;
  a multiplexer receiving as input outputs from the second AND-gate and the second NOR-gate; and
  a second register device receiving as inputs an output of the multiplexer, a clock signal, and a RESET signal, the register device outputting the third internal stop signal, wherein the third internal stop signal is used as a select signal for the multiplexer.

30. The computer system of claim 29, wherein the fast opener circuit comprising:
  a third register device receiving as inputs control information from the computer bus indicating whether a transaction is occurring, a clock signal from the computer bus, and a reset signal from the computer bus;
  a fourth OR-gate receiving as inputs the control information from the computer bus indicating whether a transaction is occurring and an output from the third register device; and
  a fifth OR-gate receiving as inputs an inverted output from the fourth OR-gate and the third internal stop signal from the target window controller, the fifth OR-gate generating the first control signal.

31. The computer system of claim 30, wherein the master window controller comprising a sixth OR-gate receiving as inputs control information from the computer bus indicating whether a target device is ready for a transaction and the signal indicating whether there is an active bus master, the master window controller generating the second control signal.

32. The computer system of claim 31, wherein the window hardware circuit comprising:
  a second NAND-gate receiving as inputs identification select information from the computer bus and the first control signal from the fast opener circuit, the second NAND-gate outputting a signal carrying window identification select information;
  a seventh OR-gate receiving as inputs the first control signal from the fast opener circuit and the second control signal from the master window controller;
  a first NAND-gate cluster receiving as inputs address, data, command, and byte enable information from the computer bus and an output of the sixth NOR-gate, the first NAND-gate cluster serving a NAND logic function, the first NAND-gate cluster outputting signals carrying window address, window data, window command, and window byte enable information.

33. The computer system of claim 32, wherein the first NAND-gate cluster comprising thirty-six NAND-gates, each of the thirty-six NAND-gates receiving as input the output from the seventh NAND-gate, thirty-two of the thirty-six NAND-gates receiving as input a different bit of address information from the computer bus, four of the thirty-six NAND-gates receiving as input a different bit of command information from the computer bus.

34. The computer system of claim 32 wherein the computer bus is a peripheral component interconnect (PCI) local bus.

35. A method for to control information transfer in and out of a device connected to a computer bus comprising, the method comprising the steps of:
   a) monitoring a mode of a bus transaction to determine whether the bus transaction is a target or a master transaction;
   b) monitoring a type of a bus transaction to determine whether the bus transaction is a read or write transaction;
   c) monitoring a status of a bus transaction, the computer bus mastership, and the device as a master device; and
   d) using information derived in steps (a)–(c) to close a window gate to prevent invalid information from propagating into the device.

* * * * *